US012616235B2

(12) United States Patent
Nowak et al.

(10) Patent No.: US 12,616,235 B2
(45) Date of Patent: May 5, 2026

(54) MULTILAYER EDIBLE PRODUCTS COMPRISING A CENTER AND A BARRIER LAYER

(71) Applicant: KRAFT FOODS GROUP BRANDS LLC, Chicago, IL (US)

(72) Inventors: Allison Therese Nowak, Elk Grove Village, IL (US); Dongjun Zhao, Glenview, IL (US); Jonathan Wiese, Chicago, IL (US); Kathryn Dugan Mahaffey, Chicago, IL (US); Yan Wang, Northfield, IL (US); Julia Lee Gregg-Albers, Glenview, IL (US); Judith Gulten Moca, Palatine, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 340 days.

(21) Appl. No.: 16/237,432

(22) Filed: Dec. 31, 2018

(65) Prior Publication Data

US 2020/0205460 A1 Jul. 2, 2020

(51) Int. Cl.
*A23P 20/20* (2016.01)
*A23L 25/00* (2016.01)

(52) U.S. Cl.
CPC ............... *A23P 20/20* (2016.08); *A23L 25/00* (2016.08)

(58) Field of Classification Search
CPC .................................. A23L 25/00; A23P 20/20
See application file for complete search history.

(56) References Cited

U.S. PATENT DOCUMENTS

| | | | | |
|---|---|---|---|---|
| 4,596,714 A | * | 6/1986 | Brabbs | A23P 20/20 |
| | | | | 426/94 |
| 4,748,031 A | | 5/1988 | Koppa | |
| 5,017,400 A | | 5/1991 | Olinger | |
| 5,041,541 A | | 8/1991 | Mazur | |
| 5,073,389 A | | 12/1991 | Wienecke | |
| 5,348,758 A | | 9/1994 | Fuisz | |
| 5,362,508 A | | 11/1994 | Wheeler | |

(Continued)

FOREIGN PATENT DOCUMENTS

| | | |
|---|---|---|
| CA | 2337504 A1 | 2/2000 |
| EP | 0826306 | 3/1998 |

(Continued)

OTHER PUBLICATIONS

Phillips, Sarah. "Hydration-Bread Dough" https://web.archive.org/web/20141103151334/https://www.craftybaking.com/howto/hydration-bread-dough Nov. 3, 2014. (Year: 2014).*

(Continued)

*Primary Examiner* — Katherine D Leblanc
(74) *Attorney, Agent, or Firm* — Dinsmore & Shohl LLP

(57) ABSTRACT

A multilayer edible product includes a center, a barrier layer directly encompassing at least a portion of the center, and an outer layer directly encompassing the barrier layer and indirectly encompassing the center. The barrier layer includes a hydrophilic powder and a source of fat. The center has at least one of: a fat content that is either greater than or less than a fat content of the outer layer, or a water activity that is either greater than or less than a water activity of the outer layer. A composition of the barrier layer is different than a composition of the center and a composition of the outer layer.

16 Claims, 2 Drawing Sheets

(56)  References Cited

U.S. PATENT DOCUMENTS

| | | | |
|---|---|---|---|
| 5,549,923 A | 8/1996 | Finnochiaro |
| 5,714,193 A | 2/1998 | Fix |
| 6,372,271 B1 | 4/2002 | Fritzsching |
| 7,226,630 B2 | 6/2007 | Loh |
| 7,419,695 B1 | 9/2008 | Taillie |
| 7,597,917 B2 | 10/2009 | Kortum |
| 7,727,570 B2 | 6/2010 | Louter |
| 7,803,418 B2 | 9/2010 | Garter et al. |
| 7,867,530 B2 | 1/2011 | Nielsen et al. |
| 7,892,589 B2 | 2/2011 | Casper et al. |
| 7,919,134 B2 | 4/2011 | Froseth et al. |
| 8,034,450 B2 | 10/2011 | Curtis et al. |
| 8,071,151 B2 | 12/2011 | Wilkey |
| 8,287,936 B2 | 10/2012 | Loh et al. |
| 8,475,863 B2 | 7/2013 | Perry et al. |
| 8,486,470 B2 | 7/2013 | Laukli et al. |
| 8,492,689 B2 | 7/2013 | Rodgers et al. |
| 8,506,283 B1 | 8/2013 | Gonzales |
| 8,658,952 B2 | 2/2014 | Lafferty |
| 8,697,173 B2 | 4/2014 | Thaler et al. |
| 8,770,098 B2 | 7/2014 | Asensio et al. |
| 8,906,441 B2 | 12/2014 | Rajesh et al. |
| 8,940,355 B2 | 1/2015 | van den Berg et al. |
| 9,060,531 B2 | 6/2015 | Sanchez et al. |
| 9,119,410 B2 | 9/2015 | Kino et al. |
| 9,193,515 B2 | 11/2015 | Lestage et al. |
| 9,326,541 B2 | 5/2016 | Carrillo et al. |
| 9,351,501 B2 | 5/2016 | Couttenye et al. |
| 9,351,506 B2 | 5/2016 | Bontemps |
| 9,445,607 B2 | 9/2016 | Morikawa et al. |
| 9,554,591 B2 | 1/2017 | Marangoni et al. |
| 9,572,352 B2 | 2/2017 | Pul |
| 9,801,393 B2 | 10/2017 | Buttini et al. |
| 9,999,230 B2 | 6/2018 | Schubert et al. |
| 10,111,443 B2 | 10/2018 | Molchan et al. |
| 10,357,039 B2 | 7/2019 | Reinhart et al. |
| 2002/0009522 A1 | 1/2002 | Hirai |
| 2003/0077356 A1 | 4/2003 | Campbell |
| 2003/0157146 A1 | 8/2003 | Rautonen |
| 2003/0170347 A1 | 9/2003 | McCabe |
| 2003/0170355 A1 | 9/2003 | Glazier |
| 2003/0198713 A1 | 10/2003 | Clark |
| 2003/0211223 A1 | 11/2003 | Eichelberger |
| 2003/0211224 A1 | 11/2003 | Eichelberger |
| 2004/0096567 A1 | 5/2004 | Thaler |
| 2004/0103821 A1 | 6/2004 | Shobu |
| 2004/0197446 A1 | 10/2004 | Haynes |
| 2004/0197459 A1 | 10/2004 | Gaonkar |
| 2004/0253347 A1 | 12/2004 | Gaonkar |
| 2005/0191390 A1 | 9/2005 | Krochta |
| 2005/0214424 A1 | 9/2005 | De Meuter |
| 2006/0110493 A1 | 5/2006 | Schnieber |
| 2006/0222745 A1 | 10/2006 | Baumer |
| 2006/0286241 A1 | 12/2006 | Krinski |
| 2007/0087084 A1 | 4/2007 | Coleman |
| 2007/0116810 A1 | 5/2007 | Haynes |
| 2007/0141198 A1 | 6/2007 | Yang |
| 2007/0148285 A1 | 6/2007 | Yang |
| 2008/0014277 A1 | 1/2008 | Medri |
| 2008/0050473 A1 | 2/2008 | Nemeth et al. |
| 2008/0050484 A1 | 2/2008 | Kijowski |
| 2008/0131564 A1* | 6/2008 | Nalur ..................... A23G 9/322 |
| | | 426/93 |
| 2008/0166456 A1 | 7/2008 | Kortum et al. |
| 2008/0206411 A1 | 8/2008 | Nielsen |
| 2008/0241345 A1 | 10/2008 | Silenzi |
| 2008/0286409 A1 | 11/2008 | Topsoe |
| 2008/0311240 A1 | 12/2008 | Stouffs |
| 2009/0081335 A1 | 3/2009 | Ortiz et al. |
| 2009/0087521 A1 | 4/2009 | Belanger et al. |
| 2009/0098241 A1 | 4/2009 | Thorengaard |
| 2009/0136641 A1 | 5/2009 | Azam |
| 2009/0148568 A1 | 6/2009 | Kawamura |
| 2009/0214445 A1 | 8/2009 | Boghani |
| 2009/0220654 A1 | 9/2009 | Kino |

| | | | |
|---|---|---|---|
| 2009/0269446 A1 | 10/2009 | Rabault et al. |
| 2009/0285944 A1 | 11/2009 | Rabault et al. |
| 2009/0304865 A1 | 12/2009 | Ashourian |
| 2009/0317522 A1 | 12/2009 | Nielsen et al. |
| 2010/0062116 A1 | 3/2010 | Noort et al. |
| 2010/0112141 A1 | 5/2010 | Panaioli et al. |
| 2010/0136182 A1 | 6/2010 | Rabault et al. |
| 2010/0143544 A1 | 6/2010 | Narumiya et al. |
| 2010/0209588 A1 | 8/2010 | Loh |
| 2010/0215805 A1 | 8/2010 | Hahn |
| 2010/0239720 A1 | 9/2010 | Jensen et al. |
| 2010/0297301 A1 | 11/2010 | Fukasawa et al. |
| 2010/0316772 A1 | 12/2010 | Zubanas et al. |
| 2011/0020502 A1 | 1/2011 | Nack et al. |
| 2011/0027420 A1 | 2/2011 | Mehansho |
| 2011/0039004 A1 | 2/2011 | Garter |
| 2011/0104356 A1 | 5/2011 | Coleman et al. |
| 2011/0129575 A1 | 6/2011 | Li et al. |
| 2011/0223289 A1 | 9/2011 | Diguet et al. |
| 2011/0229608 A1 | 9/2011 | Plessier et al. |
| 2011/0256278 A1 | 10/2011 | Hansa et al. |
| 2012/0064200 A1 | 3/2012 | Lochet et al. |
| 2012/0114806 A1 | 5/2012 | Pohludka |
| 2012/0164268 A1 | 6/2012 | Pearson |
| 2012/0321753 A1 | 12/2012 | Michels et al. |
| 2013/0022713 A1 | 1/2013 | Hayes-Jacobson et al. |
| 2013/0052307 A1 | 2/2013 | Elejalde |
| 2013/0059040 A1 | 3/2013 | Proper |
| 2013/0101698 A1 | 4/2013 | Coleman et al. |
| 2013/0108749 A1 | 5/2013 | Bombard et al. |
| 2013/0171299 A1 | 7/2013 | Clarke et al. |
| 2013/0209644 A1 | 8/2013 | Miladinov |
| 2013/0216680 A1 | 8/2013 | Yamada |
| 2013/0344193 A1 | 12/2013 | Strecker |
| 2014/0044839 A1 | 2/2014 | Cattaruzza et al. |
| 2014/0120208 A1 | 5/2014 | Mateus et al. |
| 2014/0205719 A1 | 7/2014 | Lanvin |
| 2014/0220218 A1 | 8/2014 | Coleman |
| 2014/0234498 A1 | 8/2014 | Morikawa et al. |
| 2015/0072047 A1 | 3/2015 | Harris et al. |
| 2015/0079249 A1 | 3/2015 | Shubert |
| 2015/0135973 A1 | 5/2015 | Pul |
| 2015/0147439 A1 | 5/2015 | Chouikhi |
| 2015/0150289 A1 | 6/2015 | Chatel |
| 2015/0164090 A1 | 6/2015 | Carr et al. |
| 2015/0201627 A1 | 7/2015 | Torres San Juan et al. |
| 2015/0223477 A1 | 8/2015 | Vander Stichele et al. |
| 2015/0250190 A1* | 9/2015 | Vemulapalli ........... A21D 8/025 |
| | | 426/549 |
| 2015/0296808 A1 | 10/2015 | Ploof et al. |
| 2015/0305392 A1 | 10/2015 | Alexander |
| 2015/0313264 A1 | 11/2015 | Bolla |
| 2015/0320057 A1 | 11/2015 | Cha et al. |
| 2015/0320072 A1 | 11/2015 | Bufton et al. |
| 2015/0327569 A1 | 11/2015 | Kessell |
| 2015/0342215 A1 | 12/2015 | Watterson |
| 2015/0351430 A1 | 12/2015 | Pipe et al. |
| 2016/0000113 A1 | 1/2016 | Potter |
| 2016/0015043 A1 | 1/2016 | Mihalos et al. |
| 2016/0081358 A1 | 3/2016 | Leicht et al. |
| 2016/0081383 A1 | 3/2016 | Gamberi |
| 2016/0100601 A1 | 4/2016 | Kempter et al. |
| 2016/0128343 A1 | 5/2016 | Haas et al. |
| 2016/0174580 A1 | 6/2016 | Stenvik |
| 2016/0183578 A1 | 6/2016 | Wonschik |
| 2016/0198750 A1 | 7/2016 | Carlson |
| 2016/0213035 A1 | 7/2016 | De Ruiter et al. |
| 2016/0242433 A1 | 8/2016 | Schwenker |
| 2016/0242450 A1 | 8/2016 | Magana |
| 2016/0262429 A1 | 9/2016 | Fase, Jr. et al. |
| 2016/0286826 A1 | 10/2016 | Kino et al. |
| 2016/0356726 A1 | 12/2016 | Bathelet et al. |
| 2017/0055559 A1 | 3/2017 | Kino et al. |
| 2017/0079285 A1 | 3/2017 | Szrama |
| 2017/0094982 A1 | 4/2017 | Roussel et al. |
| 2017/0164635 A1 | 6/2017 | Degady et al. |
| 2017/0196237 A1 | 7/2017 | Wegst |
| 2017/0196254 A1 | 7/2017 | Michiels et al. |
| 2017/0258106 A1 | 9/2017 | Rabault et al. |

(56) References Cited

U.S. PATENT DOCUMENTS

| | | | |
|---|---|---|---|
| 2017/0332677 A1 | 11/2017 | Rodriguez et al. | |
| 2018/0007918 A1 | 1/2018 | Branco | |
| 2018/0027824 A1 | 2/2018 | Roso | |
| 2018/0206508 A1 | 7/2018 | Rabault et al. | |
| 2018/0242629 A1 | 8/2018 | Watterson et al. | |
| 2018/0317503 A1 | 11/2018 | De Pauw et al. | |
| 2018/0317528 A1 | 11/2018 | Hitzfeld | |
| 2018/0355020 A1 | 12/2018 | Anchel | |
| 2018/0368452 A1 | 12/2018 | Shoop et al. | |
| 2019/0037858 A1 | 2/2019 | Weinstein | |
| 2019/0053512 A1 | 2/2019 | Lagache | |
| 2021/0195929 A1 | 7/2021 | Nowak | |
| 2021/0195934 A1 | 7/2021 | Nowak | |
| 2021/0195935 A1 | 7/2021 | Nowak | |

FOREIGN PATENT DOCUMENTS

| | | | |
|---|---|---|---|
| EP | 1080643 | | 3/2001 |
| EP | 1488704 | | 12/2004 |
| EP | 1586242 | | 10/2005 |
| EP | 1992232 | | 11/2008 |
| EP | 2123162 | A3 | 2/2010 |
| EP | 2392214 | A1 | 12/2011 |
| EP | 2452563 | A1 | 5/2012 |
| EP | 2191723 | B1 | 4/2015 |
| EP | 2452569 | B1 | 9/2016 |
| EP | 3192372 | A1 | 7/2017 |
| EP | 3369323 | A1 | 9/2018 |
| GB | 2503238 | | 12/2013 |
| JP | 4403100 | B2 | 1/2010 |
| JP | 4436269 | B2 | 3/2010 |
| JP | 4503517 | B2 | 7/2010 |
| JP | 4564085 | B2 | 10/2010 |
| JP | 2011030551 | A | 2/2011 |
| JP | 4775326 | B2 | 9/2011 |
| JP | 4785356 | B2 | 10/2011 |
| JP | 4819300 | B2 | 11/2011 |
| JP | 2011244803 | A | 12/2011 |
| JP | 4958180 | B2 | 6/2012 |
| JP | 5315930 | B2 | 10/2013 |
| JP | 2013215172 | A | 10/2013 |
| JP | 5470133 | B2 | 4/2014 |
| JP | 2014168391 | A | 9/2014 |
| JP | 2014197998 | A | 10/2014 |
| JP | 2014204670 | A | 10/2014 |
| JP | 2014233239 | A | 12/2014 |
| JP | 2015019656 | A | 2/2015 |
| JP | 2015213475 | A | 12/2015 |
| JP | 2016082888 | A | 5/2016 |
| JP | 2016096759 | A | 5/2016 |
| JP | 5930608 | B2 | 6/2016 |
| JP | 2016111942 | A | 6/2016 |
| JP | 2016144434 | A | 8/2016 |
| JP | 2016158571 | A | 9/2016 |
| JP | 2016159925 | | 9/2016 |
| JP | 6008471 | B2 | 10/2016 |
| JP | 2019000107 | | 1/2019 |
| WO | 2001022835 | | 4/2001 |
| WO | 2003059084 | | 7/2003 |
| WO | 2012136854 | | 10/2012 |
| WO | 2012152650 | | 11/2012 |
| WO | 2012173004 | A1 | 12/2012 |
| WO | 2013083392 | | 6/2013 |
| WO | 2014001828 | A1 | 1/2014 |
| WO | 2015156265 | A1 | 10/2015 |
| WO | 2016005876 | A1 | 1/2016 |
| WO | 2016114079 | A1 | 7/2016 |
| WO | 2017118746 | A1 | 7/2017 |
| WO | 2018046054 | | 3/2018 |
| WO | 2018067373 | | 4/2018 |
| WO | 2018231802 | | 12/2018 |

OTHER PUBLICATIONS

Machine Translation EP2191723A1 Corlay Jun. 2, 2010 (Year: 2010).*

"Get Control Over Ice Cream Coatings", Food & Drink Technology, Jan. 14, 2016, Bell Publishing Ltd., Gravesend, UK.

"Oil Stabilization of Natural Peanut Butter Using Food Grade Polymers", Food Hydrocolloids, Mar. 9, 2016, p. 399-408, vol. 61, Elsevier, Guelph, CA.

"Controlling the Stability of Chocolates Through the Incorporation of Soft and Hard StOSt-rich Fats", European Journal of Lipid Science and Technology, Feb. 1, 2015, Wiley-VCH Verlag Gmbh & Co. KGaA, Weinheim, DE.

"Application of Novel Acoustic Measurement Techniques for Texture Analysis of Co-extruded Snacks", LWT Food Science and Technology, Aug. 3, 2016, p. 582-589, vol. 75, Elsevier, Guelph, CA.

"Application of Transglutaminase-Crosslinked Whey Protein/Pectin Films as Water Barrier Coatings in Fried and Baked Foods", Food Bioprocess Technology, Sep. 15, 2012, p. 477-755, vol. 7, Springer Science+Business Media, New York.

"Effect of Lentinus edodes—Glucan-Enriched Materials on the Textural, Rheological, and Oil-Resisting Properties of Instant Fried Noodles", Food Bioprocess Technology, Jul. 14, 2011, p. 553-560, vol. 6, Springer Science+Business Media, New York.

International Patent Application No. PCT/US2019/067017, International Search Report, date of actual completion Mar. 3, 2020, 5 pages.

International Patent Application No. PCT/US2019/067017, Written Opinion of the International Searching Authority, date of actual completion Mar. 3, 2020, 6 pages.

Examination Report for EP 19842918.5, mail date Mar. 2, 2023, 5 pages.

* cited by examiner

MULTILAYER EDIBLE PRODUCTS COMPRISING A CENTER AND A BARRIER LAYER

BACKGROUND

Field

The present specification generally relates to multilayer edible products having a center and a barrier layer. In particular, the present specification relates to multilayer edible products that include a nut-based center and a barrier layer that separates the nut-based center from an outer layer.

Technical Background

Nut-based compositions, such as, for example, nut pastes or nut butters, are generally semi-solid at room temperature and when heated by conventional means, such as by microwave, there is minimal phase transition, resulting in a heated semi-solid nut-based composition. This semi-solid nut-based composition is not desirable to consumers, who prefer a gooey, semi-liquidus heated nut-based composition. In addition, when nut-based compositions are heated, they have a tendency to have an oil-phase separation that results in possible diffusion of layers adjacent to the nut-based composition. These drawbacks have prevented nut-based compositions from being used in edible food products, and particularly in edible food products with multiple layers that are to be heated to go through phase transition.

As noted above, fat and moisture migration from one layer of an edible food product due to fat differential gradients and water activity is a problem in food products. This migration can result in unstable products with short shelf lives and can cause microbial or product quality issues.

Accordingly, a need exists for multilayer edible products that prevent migration of fat and moisture from the center to other layers of the multilayer edible products, and particularly prevents the migration of fat and moisture from nut-based centers.

SUMMARY

According to one embodiment, a multilayer edible product comprises: a center; a barrier layer directly encompassing at least a portion of the center, the barrier layer comprising: a hydrophilic powder; and a source of fat; and an outer layer directly encompassing the barrier layer and indirectly encompassing the center, wherein the center has at least one of: a fat content that is either greater than or less than a fat content of the outer layer, or a water activity that is either greater than or less than a water activity of the outer layer, and wherein a composition of the barrier layer is different than a composition of the center and a composition of the outer layer.

In another embodiment, the center comprises: greater than or equal to 53.0 wt % pulverized nuts; greater than or equal to 10.0 wt % hydrophilic powder; greater than or equal to 0.0 wt % low-melting temperature fat; and greater than or equal to 5.0 wt % high-melting temperature fat, wherein the center has a viscosity less than or equal to 1000 Pa·s at temperatures less than or equal to 50° C.

Additional features and advantages of the protein products described herein and methods for making the same will be set forth in the detailed description which follows, and will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
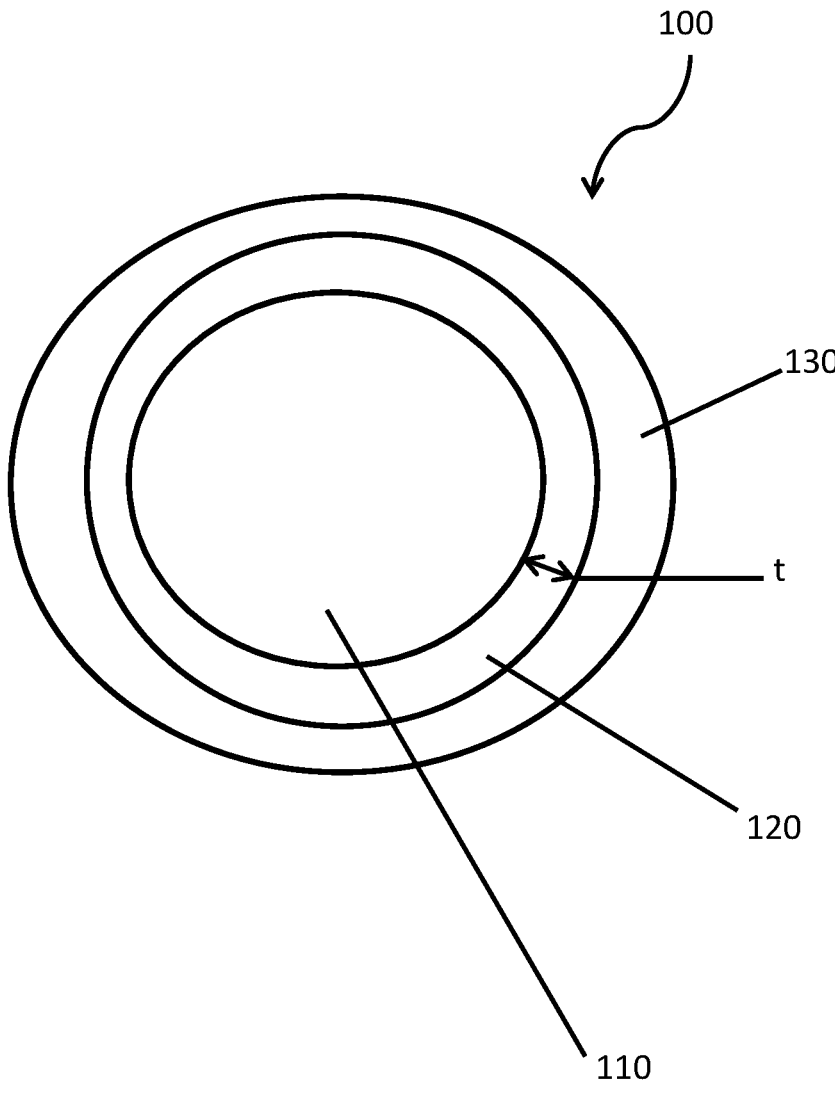
FIG. 1 is a schematic depiction of a cross section of a multilayer edible product according to embodiments disclosed and described herein.

Reference will now be made in detail to various embodiments of multilayer edible products comprising a center of the multilayer edible product and a barrier layer. Whenever possible, the same reference numerals will be used throughout the drawings to refer to the same or like parts. According to embodiments, a multilayer edible product comprises: a center; a barrier layer directly encompassing at least a portion of the center, the barrier layer comprising: a hydrophilic powder; and a source of fat; and an outer layer directly encompassing the barrier layer and indirectly encompassing the center, wherein the center has at least one of: a fat content that is either greater than or less than a fat content of the outer layer, or a water activity that is either greater than or less than a water activity of the outer layer, and wherein a composition of the barrier layer is different than a composition of the center and a composition of the outer layer. Various embodiments of multilayer edible products comprising a center and a barrier layer will now be described with reference to the appended drawings.

It should be understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other.

Unless otherwise specified, a range of values, when recited, includes both the upper and lower limits of the range as well as any ranges there between. As used herein, the indefinite articles "a," "an," and the corresponding definite article "the" mean "at least one" or "one or more," unless otherwise specified. It also is understood that the various features disclosed in the specification and the drawings can be used in any and all combinations.

With reference now to FIG. 1, a cross section of a multilayer edible product 100 comprises a center 110, a barrier layer 120, and an outer layer 130. Although the embodiment of the multilayer edible product 100 depicted in FIG. 1 is cylindrical or spherical in shape, it should be understood that in embodiments, the multilayer edible product 100 may have any suitable geometrical shape. As shown in FIG. 1, according to embodiments, a center 110 is located at the middle of the multilayer edible product 100. Positioned on, and in physical contact with, the center 110 is a barrier layer 120. As mentioned hereinabove, fat and moisture has a tendency to migrate from the center 110 to outer layers 130 of the multilayer edible product—such as the outer layer 130—which results in diffusion of the outer layers with fat and moisture. The barrier layer 120 is positioned between, and in physical contact with, the center 110 and the outer layer 130 to prevent this migration of fat and/or moisture from the center 110 to the outer layers. Accordingly, in embodiments, the barrier layer 120 completely, and directly, encompasses the center 110. As used herein, "completely encompasses" means that the barrier layer 120 covers the center 110 in such a way that little to no fat or moisture is able to migrate from the center to the outer layer 130, and "directly" means that there is physical contact between layers (such as, physical contact between the center 110 and the barrier layer 120). In some embodiments, the barrier layer 120 does not completely encompass the center 110, but the barrier layer 120 covers the center so that any migration of fat or moisture from the center 110 to the outer layer 130 does not affect the flavor or consistency of the multilayer edible product 100.

As shown in FIG. 1, multilayer edible products 100 according to embodiments also include an outer layer 130 positioned on, and in physical contact with, the barrier layer 120, such that the barrier layer is present between, and in physical contact with, the center 110 and the outer layer 130. According to embodiments, the outer layer 130 indirectly encompasses the center 110. As used herein "indirectly encompasses" means that a layer surrounds but is not in physical contact with another layer (such as the outer layer 130 that surrounds the center 110, but the outer layer 130 is not in physical contact the center 110 because the barrier layer 120 is positioned between the center 110 and the outer layer 130).

Figure 2:
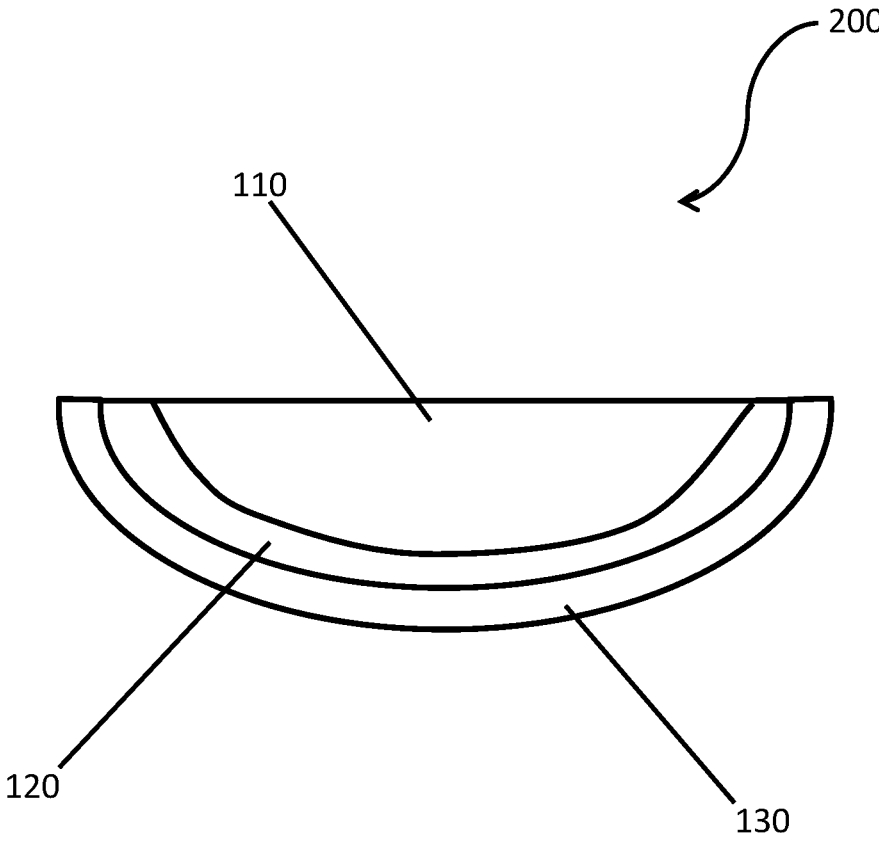
FIG. 2 is a schematic depiction of a cross section of a multilayer edible product according to embodiments disclosed and described herein.

With reference now to FIG. 2, which is a cross section of multilayer edible products according to embodiments, multilayer edible products 200 according to some embodiments may comprise a barrier layer 120 and an outer layer 130 that do not encompass the center 110. According to the embodiment depicted in FIG. 2, the barrier layer 120 and the outer layer 130 cover only a portion of the center 110. In these embodiments, the barrier layer 120 is present between, and in physical contact with, the center 110 and the outer layer 130, which is not in physical contact with the center 110. Each of the center 110, the barrier layer 120, and the outer layer 130 of the multilayer edible product 100, 200 will be described in more detail below.

The Center

As described above, the center 110 of the multilayer edible product 100, 200 is, according to embodiments, generally located at a geometrical center of the multilayer food product 100, 200. However, in some embodiments, the center 110 may be located at any position of the multilayer food product 100, 200 so long as the center 110 is at least partially covered by the barrier layer 120 and the outer layer 130. For example, in some embodiments, the multilayer edible product 100, 200 may comprise a plurality of centers 110 at various positions within the multilayer edible product 100, 200, where each of the plurality of centers 110 is at least partially covered by the barrier layer 120 and the outer layer 130.

According to embodiments, the composition of the center 110 of the multilayer edible product 100, 200 has a fat content that is either greater than or less than the fat content of the outer layer 130 and/or has a water activity that is either greater than or less than the water activity of the outer layer 130. As described above, when there is a fat content differential between the center 110 and the fat content of the outer layer 130 (such as when the fat content of the center is either greater than or less than the fat content of the outer layer), and/or there is a water activity differential between the center 110 and the outer layer 130 (such as when the water activity of the center is either greater than or less than the water activity of the outer layer), fat and/or moisture may migrate from the center 110 to the outer layer 130 or may migrate from the outer layer 130 to the center 110. It should be understood that the greater the difference between either or both of the fat content and the water activity of the center 110 and the outer layer 130, the more pronounced the migration of fat and/or moisture will be.

Although the composition of the center 110 is not particularly limited—so long as the center 110 has a fat content that is greater than or less than the fat content of the outer layer 130 and/or has a water activity that is greater than or less than the water activity of the outer layer 130—nut-based centers typically will have a fat content that is greater than the fat content of the outer layer 130 and/or nut-based centers typically have a water activity that is less than the water activity of the outer layer 130. Accordingly, in embodiments, the center 110 may comprise nuts. As used herein, "nuts" is not strictly limited to scientific definitions thereof and may include other plant-based products commonly referred to as nuts, such as, for example, legumes like peanuts (also referred to as ground nuts or goobers). Accordingly, in embodiments, the center 110 of a multilayer edible product 100, 200 may comprise "nuts," such as tree nuts and legumes. In embodiments, the center may comprise tree nuts such as, for example, almonds, cashews, chestnuts, hazelnuts, and the like. In embodiments, the center may comprise legumes such as, for example, peanuts and walnuts. In some embodiments, the nut-based center comprises almonds or peanuts.

In embodiments where the center comprises nuts, the nuts are pulverized into a desired particle size. As should be understood, the particle size of the pulverized nuts will affect the consistency and overall mouth feel of the center 110 of the multilayer edible product 100, 200. For instance, if the particle size of the nuts is too large, the center will be gritty, have an undesirable mouth feel, and will not melt homogeneously. In embodiments, the nuts may be pulverized by any conventional mechanism, such as grinding, milling, pressing, jet milling, food processing, mortar and pestle, and the like. According to embodiments, the nuts may be pulverized such that a medium particle size distribution, $D_{50}$, as measured by laser diffraction, is less than or equal to 25.0 $\mu$m, such as less than or equal to 22.0 $\mu$m, less than or equal to 20.0 $\mu$m, less than or equal to 18.0 $\mu$m, less than or equal to 15.0 $\mu$m, less than or equal to 12.0 $\mu$m, less than or equal to 10.0 $\mu$m, less than or equal to 8.0 $\mu$m, or less than or equal to 5.0 $\mu$m. Thus, according to embodiments, the nuts may be pulverized such that a medium particle size distribution, $D_{50}$, is from greater than or equal to 0.0 $\mu$m to less than or equal to 25.0 $\mu$m, such as from greater than or equal to 5.0 $\mu$m to less than or equal to 22.0 $\mu$m, from greater than or equal to 10.0 μm to less than or equal to 20.0 μm, from greater than or equal to 12.0 μm to less than or equal to 18.0 μm, or about 15 μm.

According to embodiments, the nuts may be pulverized such that a particle size distribution, $D_{90}$, as measured by laser diffraction is less than or equal to 55.0 μm, such as less than or equal to 52.0 μm, less than or equal to 50.0 μm, less than or equal to 48.0 μm, less than or equal to 45.0 μm, less than or equal to 42.0 μm, less than or equal to 40.0 μm, less than or equal to 38.0 μm, or less than or equal to 35.0 μm. Thus, according to embodiments, the nuts may be pulverized such that a particle size distribution, $D_{90}$, is from greater than or equal to 30.0 μm to less than or equal to 55.0 μm, such as from greater than or equal to 35.0 μm to less than or equal to 52.0 μm, from greater than or equal to 38.0 μm to less than or equal to 50.0 μm, from greater than or equal to 40.0 μm to less than or equal to 48.0 μm, or about 45 μm.

In embodiments where the center 110 comprises pulverized nuts, the center 110 may also comprise other components, such as hydrophilic powder, high-melting temperature fat, and optionally, low-temperature melting fat. According to embodiments, the center may be a nut-based center comprising greater than or equal to 53.0 wt % pulverized nuts (as described above), greater than or equal to 10.0 wt % hydrophilic powder, greater than or equal to 5.0 wt % high-melting temperature fat, and greater than or equal to 0.0 wt % low-melting temperature fat. Each of the hydrophilic powder, high-melting temperature fat, and low-melting temperature fat will be described in more detail below.

According to embodiments, the center 110 may comprise greater than or equal to 53.0 wt % pulverized nuts, such as greater than or equal to 55.0 wt % pulverized nuts, greater than or equal to 58.0 wt % pulverized nuts, greater than or equal to 60.0 wt % pulverized nuts, greater than or equal to 62.0 wt % pulverized nuts, greater than or equal to 65.0 wt % pulverized nuts, or greater than or equal to 68.0 wt % pulverized nuts. For each of the above ranges, the maximum content of pulverized nuts present in the center may be, according to embodiments, 70.0 wt %. Accordingly, in embodiments, the content of pulverized nuts in the center may be from greater than or equal to 53.0 wt % to less than or equal to 70.0 wt %, such as from greater than or equal to 55.0 wt % to less than or equal to 70.0 wt %, from greater than or equal to 58.0 wt % to less than or equal to 70.0 wt %, from greater than or equal to 60.0 wt % to less than or equal to 70.0 wt %, from greater than or equal to 62.0 wt % to less than or equal to 70.0 wt %, from greater than or equal to 65.0 wt % to less than or equal to 70.0 wt %, or from greater than or equal to 68.0 wt % to less than or equal to 70.0 wt %. In embodiments, the content of pulverized nuts in the center may be from greater than or equal to 53.0 wt % to less than or equal to 68.0 wt %, such as from greater than or equal to 53.0 wt % to less than or equal to 65.0 wt %, from greater than or equal to 53.0 wt % to less than or equal to 62.0 wt %, from greater than or equal to 53.0 wt % to less than or equal to 60.0 wt %, from greater than or equal to 53.0 wt % to less than or equal to 58.0 wt %, or from greater than or equal to 53.0 wt % to less than or equal to 55.0 wt %. In some embodiments, the content of pulverized nuts in the center may be from greater than or equal to 55.0 wt % to less than or equal to 68.0 wt %, such as from greater than or equal to 58.0 wt % to less than or equal to 65.0 wt %, or from greater than or equal to 60.0 wt % to less than or equal to 62.0 wt %.

As disclosed above, the center 110 may comprise a hydrophilic powder. The hydrophilic powder may, according to embodiments, be powdered sugar, flour, salt, and mixtures thereof. The hydrophilic powder may absorb some of the fat and/or moisture in the center 110, which can mitigate some of the migration of fat and/or moisture from the center 110 to the outer layer 130. In addition, the hydrophilic powder may improve the homogeneity of the center 110 composition and provide improved mouth feel. However, if too much hydrophilic powder is added to the center 110, the hydrophilic powder may reduce the moisture of the center 110 to a level that is undesirable, and which may prevent the center 110 from melting to a desirable amount. Accordingly, in embodiments, the content of hydrophilic powder in the center 110 is greater than or equal to 10.0%, such as greater than or equal to 11.0 wt %, greater than or equal to 12.0 wt %, greater than or equal to 13.0 wt %, greater than or equal to 14.0 wt %, greater than or equal to 15.0 wt %, greater than or equal to 16.0 wt %, greater than or equal to 17.0 wt %, greater than or equal to 18.0 wt %, or greater than or equal to 19.0 wt %. In some embodiments, the maximum content of the hydrophilic powder in the center 110 may be 20.0 wt %. Accordingly, in some embodiments, the content of hydrophilic powder in the center 110 is from greater than or equal to 10.0 wt % to less than or equal to 20.0 wt %, such as from greater than or equal to 11.0 wt % to less than or equal to 20.0 wt %, from greater than or equal to 12.0 wt % to less than or equal to 20.0 wt %, from greater than or equal to 13.0 wt % to less than or equal to 20.0 wt %, from greater than or equal to 14.0 wt % to less than or equal to 20.0 wt %, from greater than or equal to 15.0 wt % to less than or equal to 20.0 wt %, from greater than or equal to 16.0 wt % to less than or equal to 20.0 wt %, from greater than or equal to 17.0 wt % to less than or equal to 20.0 wt %, from greater than or equal to 18.0 wt % to less than or equal to 20.0 wt %, or from greater than or equal to 19.0 wt % to less than or equal to 20.0 wt %. In some embodiments, the content of hydrophilic powder in the center 110 is from greater than or equal to 10.0 wt % to less than or equal to 19.0 wt %, such as from greater than or equal to 10.0 wt % to less than or equal to 18.0 wt %, from greater than or equal to 10.0 wt % to less than or equal to 17.0 wt %, from greater than or equal to 10.0 wt % to less than or equal to 16.0 wt %, from greater than or equal to 10.0 wt % to less than or equal to 15.0 wt %, from greater than or equal to 10.0 wt % to less than or equal to 14.0 wt %, from greater than or equal to 10.0 wt % to less than or equal to 13.0 wt %, from greater than or equal to 10.0 wt % to less than or equal to 12.0 wt %, or from greater than or equal to 10.0 wt % to less than or equal to 11.0 wt %. In embodiments, the content of hydrophilic powder in the center 110 is from greater than or equal to 11.0 wt % to less than or equal to 19.0 wt %, such as from greater than or equal to 12.0 wt % to less than or equal to 18.0 wt %, from greater than or equal to 13.0 wt % to less than or equal to 17.0 wt %, or from greater than or equal to 14.0 wt % to less than or equal to 16.0 wt %.

According to embodiments, the center 110 may further comprise a high-melting temperature fat. In embodiments, the high-melting temperature fat may be selected from palm oil (such as, for example, Revel™ A manufactured by Loders Croklaan), fractionated palm oil, double fractionated palm oil, fully hydrogenated coconut palm and palm kernel oils, palm kernel oil, interesterfied vegetable oil, coconut oil, partially hydrogenated oil, animal fat, and mixtures thereof. As will be discussed in more detail below, controlling the melting point and viscosity of the center 110 allows for a multilayer edible product 100, 200 with a center 110 that is gooey and homogenous when heated by conventional heating, such as microwave, which results in a desirable mouth feel. The high-melting temperature fat can be added in amounts that help to control the viscosity of the center at varying temperatures. According to embodiments, the content of the high-melting temperature fat in the center 110 may be greater than or equal to 5.0 wt %, such as greater than or equal to 6.0 wt %, greater than or equal to 7.0 wt %, greater than or equal to 8.0 wt %, or greater than or equal to 9.0 wt %. In some embodiments, the maximum content of the high-melting temperature fat in the center 110 may be 10.0 wt %. Accordingly, in embodiments, the content of the high-melting temperature fat in the center 110 may be from greater than or equal to 5.0 wt % to less than or equal to 10.0 wt %, such as from greater than or equal to 6.0 wt % to less than or equal to 10.0 wt %, from greater than or equal to 7.0 wt % to less than or equal to 10.0 wt %, from greater than or equal to 8.0 wt % to less than or equal to 10.0 wt %, or from greater than or equal to 9.0 wt % to less than or equal to 10.0 wt %. In some embodiments, the content of the high-melting temperature fat in the center 110 may be from greater than or equal to 5.0 wt % to less than or equal to 9.0 wt %, from greater than or equal to 5.0 wt % to less than or equal to 8.0 wt %, from greater than or equal to 5.0 wt % to less than or equal to 7.0 wt %, or from greater than or equal to 5.0 wt % to less than or equal to 6.0 wt %. In some embodiments, the content of the high-melting temperature fat in the center 110 may be from greater than or equal to 6.0 wt % to less than or equal to 9.0 wt %, such as from greater than or equal to 7.0 wt % to less than or equal to 8.0 wt %.

A low-melting temperature fat may optionally be added to embodiments of the center 110 Like, the high-melting temperature fat, the low-melting temperature fat can be added to help control the viscosity of the center at various temperatures. Because the low-melting temperature fat melts at low temperatures, it will lower the viscosity of the center at temperatures above its melting point. In embodiments, the low-melting temperature fat may be selected from vegetable oils, peanut oils, sunflower seed oil, olive oil, soybean oil, canola oil, corn oil, cottonseed oil, high oleic oil varieties, algal oil, and mixtures thereof. As stated above, the low-melting temperature fat is an optional component of the center 110, thus in embodiments disclosed and described herein, the center does not include any low-temperature melting fat. Accordingly, in embodiments, the content of the low-temperature melting fat in the center 110 may be greater than or equal to 0.0 wt %, such as greater than or equal to 2.0 wt %, greater than or equal to 5.0 wt %, greater than or equal to 8.0 wt %, greater than or equal to 10.0 wt %, or greater than or equal to 12.0 wt %. In some embodiments, the maximum content of the low-melting temperature fat in the center 110 may be 15.0 wt %. Accordingly, in embodiments, the content of the low-temperature melting fat in the center 110 may be from greater than or equal to 0.0 wt % to less than or equal to 15.0 wt %, such as from greater than or equal to 2.0 wt % to less than or equal to 15.0 wt %, from greater than or equal to 5.0 wt % to less than or equal to 15.0 wt %, from greater than or equal to 8.0 wt % to less than or equal to 15.0 wt %, from greater than or equal to 10.0 wt % to less than or equal to 15.0 wt %, or from greater than or equal to 12.0 wt % to less than or equal to 15.0 wt %. In embodiments, the content of the low-temperature melting fat in the center 110 may be from greater than or equal to 0.0 wt % to less than or equal to 12.0 wt %, such as from greater than or equal to 0.0 wt % to less than or equal to 10.0 wt %, from greater than or equal to 0.0 wt % to less than or equal to 8.0 wt %, from greater than or equal to 0.0 wt % to less than or equal to 5.0 wt %, or from greater than or equal to 0.0 wt % to less than or equal to 2.0 wt %. In some embodiments, the content of the low-temperature melting fat in the center 110 may be from greater than or equal to 2.0 wt % to less than or equal to 12.0 wt %, such as from greater than or equal to 5.0 wt % to less than or equal to 10.0 wt %, or about 8.0 wt %.

The pulverized nuts, hydrophilic powder, high-melting temperature fat, and, optionally, low-melting temperature fat may be mixed together to form the center 110 by any suitable method. According to embodiments, the pulverized nuts, hydrophilic powder, high-melting temperature fat, and, optionally, low-melting temperature fat are combined into a vessel and mixed at temperatures sufficient to allow for homogenous mixing of the pulverized nuts, hydrophilic powder, high-melting temperature fat, and, optionally, low-melting temperature fat. The heating and mixing may be accomplished by conventional techniques and with conventional equipment known in the art. Once the pulverized nuts, hydrophilic powder, high-melting temperature fat, and, optionally, low-melting temperature fat are combined into a homogenous mixture, the mixture is cooled to room temperature and may be formed into the center 110 by any suitable method and mechanism known in the art.

As disclosed above, the content of pulverized nuts, hydrophilic powder, high-melting temperature fat, and, optionally, low-melting temperature fat in the center 110 may be balanced to control the viscosity of the center 110 at varying temperatures. In addition to controlling the viscosity of the center 110, the content of pulverized nuts, hydrophilic powder, high-melting temperature fat, and, optionally, low-melting temperature fat in the center 110 may be balanced to control the melting temperature and relaxation time of the center 110. By controlling the viscosity, melting temperature, and relaxation time of the center 110, a center 110 may be formulated so that when the center 110 is heated by conventional heating mechanisms, such as by a microwave, the center 110 turns from semi-solid to a less viscous, gooey center with a good mouth feel.

According to embodiments, the contents of the center 110 may be balanced so that the center 110 has a viscosity less than or equal to 1000 Pa·s at temperatures less than or equal to 50° C., such as less than or equal to 1000 Pa·s at temperatures less than or equal to 48° C., less than or equal to 1000 Pa·s at temperatures less than or equal to 45° C., a viscosity less than or equal to 1000 Pa·s at temperatures less than or equal to 42° C., a viscosity less than or equal to 1000 Pa·s at temperatures less than or equal to 40° C., a viscosity less than or equal to 1000 Pa·s at temperatures less than or equal to 38° C., a viscosity less than or equal to 1000 Pa·s at temperatures less than or equal to 35° C., a viscosity less than or equal to 1000 Pa·s at temperatures less than or equal to 32° C., or a viscosity less than or equal to 1000 Pa·s at temperatures less than or equal to 30° C. According to embodiments, the minimum temperature at which the center 110 has a viscosity less than or equal to 1000 Pa·s is 25° C. Accordingly, in embodiments the contents of the center 110 may be balanced so that the center 110 has a viscosity less than or equal to 1000 Pa·s at temperatures greater than or equal to 25° C. to less than or equal to 50° C., such as a viscosity less than or equal to 1000 Pa·s at temperatures greater than or equal to 25° C. to less than or equal to 48° C., a viscosity less than or equal to 1000 Pa·s at temperatures greater than or equal to 25° C. to less than or equal to 45° C., a viscosity less than or equal to 1000 Pa·s at temperatures greater than or equal to 25° C. to less than or equal to 42° C., a viscosity less than or equal to 1000 Pa·s at temperatures greater than or equal to 25° C. to less than or equal to 40° C., a viscosity less than or equal to 1000 Pa·s at temperatures greater than or equal to 25° C. to less than or equal to 38°

C., a viscosity less than or equal to 1000 Pa·s at temperatures greater than or equal to 25° C. to less than or equal to 35° C., a viscosity less than or equal to 1000 Pa·s at temperatures greater than or equal to 25° C. to less than or equal to 32° C., or a viscosity less than or equal to 1000 Pa·s at temperatures greater than or equal to 25° C. to less than or equal to 30° C. In embodiments, the contents of the center 110 may be balanced so that the center 110 has a viscosity less than or equal to 1000 Pa·s at temperatures greater than or equal to 28° C. to less than or equal to 50° C., such as a viscosity less than or equal to 1000 Pa·s at temperatures greater than or equal to 30° C. to less than or equal to 50° C., a viscosity less than or equal to 1000 Pa·s at temperatures greater than or equal to 32° C. to less than or equal to 50° C., a viscosity less than or equal to 1000 Pa·s at temperatures greater than or equal to 35° C. to less than or equal to 50° C., a viscosity less than or equal to 1000 Pa·s at temperatures greater than or equal to 38° C. to less than or equal to 50° C., a viscosity less than or equal to 1000 Pa·s at temperatures greater than or equal to 40° C. to less than or equal to 50° C., a viscosity less than or equal to 1000 Pa·s at temperatures greater than or equal to 42° C. to less than or equal to 50° C., a viscosity less than or equal to 1000 Pa·s at temperatures greater than or equal to 45° C. to less than or equal to 50° C., or a viscosity less than or equal to 1000 Pa·s at temperatures greater than or equal to 48° C. to less than or equal to 50° C. In embodiments, the contents of the center 110 may be balanced so that the center 110 has a viscosity less than or equal to 1000 Pa·s at temperatures greater than or equal to 28° C. to less than or equal to 48° C., such as a viscosity less than or equal to 1000 Pa·s at temperatures greater than or equal to 30° C. to less than or equal to 45° C., a viscosity less than or equal to 1000 Pa·s at temperatures greater than or equal to 32° C. to less than or equal to 42° C., or a viscosity less than or equal to 1000 Pa·s at temperatures greater than or equal to 35° C. to less than or equal to 40° C., as measured by Rheological thermal analysis.

According to embodiments, the contents of the center 110 may be balanced so that the center 110 has a melting temperature of less than or equal to 57° C., such as less than or equal to 55° C., less than or equal to 52° C., less than or equal to 50° C., less than or equal to 48° C., less than or equal to 45° C., less than or equal to 42° C., less than or equal to 40° C., less than or equal to 38° C., or less than or equal to 35° C., less than or equal to 32° C., or less than or equal to 30° C. According to embodiments, the minimum melting temperature may be 28° C. Accordingly, in embodiments, the contents of the center 110 may be balanced so that the center 110 has a melting temperature from greater than or equal to 28° C. to less than or equal to 57° C., such as from greater than or equal to 28° C. to less than or equal to 55° C., from greater than or equal to 28° C. to less than or equal to 52° C., from greater than or equal to 28° C. to less than or equal to 50° C., from greater than or equal to 28° C. to less than or equal to 48° C., from greater than or equal to 28° C. to less than or equal to 45° C., from greater than or equal to 28° C. to less than or equal to 42° C., from greater than or equal to 28° C. to less than or equal to 40° C., from greater than or equal to 28° C. to less than or equal to 38° C., from greater than or equal to 28° C. to less than or equal to 35° C., from greater than or equal to 28° C. to less than or equal to 32° C., or from greater than or equal to 28° C. to less than or equal to 30° C. In embodiments, the contents of the center 110 may be balanced so that the center 110 has a melting temperature from greater than or equal to 30° C. to less than or equal to 57° C., such as from greater than or equal to 32° C. to less than or equal to 57° C., from greater than or equal to 35° C. to less than or equal to 57° C., from greater than or equal to 38° C. to less than or equal to 57° C., from greater than or equal to 40° C. to less than or equal to 57° C., from greater than or equal to 42° C. to less than or equal to 57° C., from greater than or equal to 45° C. to less than or equal to 57° C., from greater than or equal to 48° C. to less than or equal to 57° C., from greater than or equal to 50° C. to less than or equal to 57° C., from greater than or equal to 52° C. to less than or equal to 57° C., or from greater than or equal to 55° C. to less than or equal to 57° C. In embodiments, the contents of the center 110 may be balanced so that the center 110 has a melting temperature from greater than or equal to 30° C. to less than or equal to 55° C., such as from greater than or equal to 32° C. to less than or equal to 52° C., from greater than or equal to 35° C. to less than or equal to 50° C., from greater than or equal to 38° C. to less than or equal to 48° C., or from greater than or equal to 40° C. to less than or equal to 45° C., as measured by Rheological thermal analysis.

According to embodiments, the contents of the center 110 may be balanced so that the center 110 has a relaxation time, at 37° C., of less than or equal to 0.165 seconds, such as less than or equal to 0.160 seconds, less than or equal to 0.155 seconds, less than or equal to 0.150 seconds, less than or equal to 0.145 seconds, less than or equal to 0.140 seconds, less than or equal to 0.135 seconds, less than or equal to 0.130 seconds, or less than or equal to 0.125 seconds. In embodiments, the minimum relaxation time, at 37° C., is 0.120 seconds. Accordingly, in embodiments, the contents of the center 110 may be balanced so that the center 110 has a relaxation time, at 37° C., from greater than or equal to 0.120 seconds to less than or equal to 0.165 seconds, such as from greater than or equal to 0.120 seconds to less than or equal to 0.160 seconds, from greater than or equal to 0.120 seconds to less than or equal to 0.155 seconds, from greater than or equal to 0.120 seconds to less than or equal to 0.150 seconds, from greater than or equal to 0.120 seconds to less than or equal to 0.145 seconds, from greater than or equal to 0.120 seconds to less than or equal to 0.140 seconds, from greater than or equal to 0.120 seconds to less than or equal to 0.135 seconds, from greater than or equal to 0.120 seconds to less than or equal to 0.130 seconds, or from greater than or equal to 0.120 seconds to less than or equal to 0.125 seconds. In embodiments, the contents of the center 110 may be balanced so that the center 110 has a relaxation time, at 37° C., from greater than or equal to 0.125 seconds to less than or equal to 0.165 seconds, such as from greater than or equal to 0.130 seconds to less than or equal to 0.165 seconds, from greater than or equal to 0.135 seconds to less than or equal to 0.165 seconds, from greater than or equal to 0.140 seconds to less than or equal to 0.165 seconds, from greater than or equal to 0.145 seconds to less than or equal to 0.165 seconds, from greater than or equal to 0.150 seconds to less than or equal to 0.165 seconds, from greater than or equal to 0.155 seconds to less than or equal to 0.165 seconds, or from greater than or equal to 0.160 seconds to less than or equal to 0.165 seconds. In embodiments, the contents of the center 110 may be balanced so that the center 110 has a relaxation time, at 37° C., from greater than or equal to 0.130 seconds to less than or equal to 0.160 seconds, such as from greater than or equal to 0.135 seconds to less than or equal to 0.155 seconds, or from greater than or equal to 0.140 seconds to less than or equal to 0.150 seconds, as measured by Rheological thermal analysis.

Peanut-Based Center

In some embodiments where the center comprises peanuts, the peanuts are pulverized into a desired particle size.

As should be understood, the particle size of the pulverized peanuts will affect the consistency and overall mouth feel of the center 110 of the multilayer edible product 100, 200. For instance, if the particle size of the peanuts is too large, the center will be gritty, have an unpleasant mouth feel, and will not melt homogeneously. In embodiments, the peanuts may be pulverized by any conventional mechanism, such as grinding, milling, pressing, jet milling, food processing, mortar and pestle, and the like. According to embodiments, the peanuts may be pulverized such that a medium particle size distribution, $D_{50}$, as measured by laser diffraction, is less than or equal to 25.0 μm, such as less than or equal to 22.0 μm, less than or equal to 20.0 μm, less than or equal to 18.0 μm, less than or equal to 15.0 μm, less than or equal to 12.0 μm, less than or equal to 10.0 μm, less than or equal to 8.0 μm, or less than or equal to 5.0 μm. Thus, according to embodiments, the peanuts may be pulverized such that a medium particle size distribution, $D_{50}$, is from greater than or equal to 2.0 μm to less than or equal to 25.0 μm, such as from greater than or equal to 5.0 μm to less than or equal to 22.0 μm, from greater than or equal to 10.0 μm to less than or equal to 20.0 μm, from greater than or equal to 12.0 μm to less than or equal to 18.0 μm, or about 15 μm.

According to embodiments, the peanuts may be pulverized such that a particle size distribution, $D_{90}$, as measured by laser diffraction, is less than or equal to 55.0 μm, such as less than or equal to 52.0 μm, less than or equal to 50.0 μm, less than or equal to 48.0 μm, less than or equal to 45.0 μm, less than or equal to 42.0 μm, less than or equal to 40.0 μm, less than or equal to 38.0 μm, or less than or equal to 35.0 μm. Thus, according to embodiments, the peanuts may be pulverized such that a particle size distribution, $D_{90}$, is from greater than or equal to 30.0 μm to less than or equal to 55.0 μm, such as from greater than or equal to 35.0 μm to less than or equal to 52.0 μm, from greater than or equal to 38.0 μm to less than or equal to 50.0 μm, from greater than or equal to 40.0 μm to less than or equal to 48.0 μm, or about 45 μm.

In embodiments where the center 110 comprises pulverized peanuts, the center 110 may also comprise other components, such as hydrophilic powder, high-melting temperature fat, and optionally, low-temperature melting fat. According to embodiments, the center may be a peanut-based center comprising greater than or equal to 53.0 wt % pulverized peanuts (as described above), greater than or equal to 10.0 wt % hydrophilic powder, greater than or equal to 5.0 wt % high-melting temperature fat, and greater than or equal to 0.0 wt % low-melting temperature fat. Each of the hydrophilic powder, high-melting temperature fat, and low-melting temperature fat will be described in more detail below.

According to embodiments, the center 110 may comprise greater than or equal to 53.0 wt % pulverized peanuts, such as greater than or equal to 55.0 wt % pulverized peanuts, greater than or equal to 58.0 wt % pulverized peanuts, greater than or equal to 60.0 wt % pulverized peanuts, or greater than or equal to 62.0 wt % pulverized peanuts. For each of the above ranges, the maximum content of pulverized peanuts present in the center may be, according to embodiments, 65.0 wt %. Accordingly, in embodiments, the content of pulverized peanuts in the center may be from greater than or equal to 53.0 wt % to less than or equal to 65.0 wt %, such as from greater than or equal to 55.0 wt % to less than or equal to 65.0 wt %, from greater than or equal to 58.0 wt % to less than or equal to 65.0 wt %, from greater than or equal to 60.0 wt % to less than or equal to 65.0 wt %, or from greater than or equal to 62.0 wt % to less than or equal to 65.0 wt %. In embodiments, the content of pulverized peanuts in the center may be from greater than or equal to 53.0 wt % to less than or equal to 62.0 wt %, such as from greater than or equal to 53.0 wt % to less than or equal to 60.0 wt %, from greater than or equal to 53.0 wt % to less than or equal to 58.0 wt %, or from greater than or equal to 53.0 wt % to less than or equal to 55.0 wt %. In some embodiments, the content of pulverized peanuts in the center may be from greater than or equal to 55.0 wt % to less than or equal to 63.0 wt %, such as from greater than or equal to 58.0 wt % to less than or equal to 62.0 wt %.

As disclosed above, the center 110 may comprise a hydrophilic powder. The hydrophilic powder may, according to embodiments, be powdered sugar, flour, salt, and mixtures thereof. The hydrophilic powder may absorb some of the fat and/or moisture in the center 110, which can mitigate some of the migration of fat and/or moisture from the center 110 to the outer layer 130. In addition, the hydrophilic powder may improve the homogeneity of the center 110 composition and provide improved mouth feel. However, if too much hydrophilic powder is added to the center 110, the hydrophilic powder may reduce the moisture of the center 110 to a level that is undesirable, and which may prevent the center 110 from melting to a desirable amount. Accordingly, in embodiments, the content of hydrophilic powder in the center 110 is greater than or equal to 10.0%, such as greater than or equal to 11.0 wt %, greater than or equal to 12.0 wt %, greater than or equal to 13.0 wt %, greater than or equal to 14.0 wt %, greater than or equal to 15.0 wt %, greater than or equal to 16.0 wt %, greater than or equal to 17.0 wt %, greater than or equal to 18.0 wt %, or greater than or equal to 19.0 wt %. In some embodiments, the maximum content of the hydrophilic powder in the center 110 may be 20.0 wt %. Accordingly, in some embodiments, the content of hydrophilic powder in the center 110 is from greater than or equal to 10.0 wt % to less than or equal to 20.0 wt %, such as from greater than or equal to 11.0 wt % to less than or equal to 20.0 wt %, from greater than or equal to 12.0 wt % to less than or equal to 20.0 wt %, from greater than or equal to 13.0 wt % to less than or equal to 20.0 wt %, from greater than or equal to 14.0 wt % to less than or equal to 20.0 wt %, from greater than or equal to 15.0 wt % to less than or equal to 20.0 wt %, from greater than or equal to 16.0 wt % to less than or equal to 20.0 wt %, from greater than or equal to 17.0 wt % to less than or equal to 20.0 wt %, from greater than or equal to 18.0 wt % to less than or equal to 20.0 wt %, or from greater than or equal to 19.0 wt % to less than or equal to 20.0 wt %. In some embodiments, the content of hydrophilic powder in the center 110 is from greater than or equal to 10.0 wt % to less than or equal to 19.0 wt %, such as from greater than or equal to 10.0 wt % to less than or equal to 18.0 wt %, from greater than or equal to 10.0 wt % to less than or equal to 17.0 wt %, from greater than or equal to 10.0 wt % to less than or equal to 16.0 wt %, from greater than or equal to 10.0 wt % to less than or equal to 15.0 wt %, from greater than or equal to 10.0 wt % to less than or equal to 14.0 wt %, from greater than or equal to 10.0 wt % to less than or equal to 13.0 wt %, from greater than or equal to 10.0 wt % to less than or equal to 12.0 wt %, or from greater than or equal to 10.0 wt % to less than or equal to 11.0 wt %. In embodiments, the content of hydrophilic powder in the center 110 is from greater than or equal to 11.0 wt % to less than or equal to 19.0 wt %, such as from greater than or equal to 12.0 wt % to less than or equal to 18.0 wt %, from greater than or equal to 13.0 wt % to less than or equal to 17.0 wt %, or from greater than or equal to 14.0 wt % to less than or equal to 16.0 wt %.

According to embodiments, the center 110 may further comprise a high-melting temperature fat. In embodiments, the high-melting temperature fat may be selected palm oil (such as, for example, Revel™ A manufactured by Loders Croklaan), fractionated palm oil, double fractionated palm oil, fully hydrogenated coconut palm and palm kernel oils, palm kernel oil, interesterfied vegetable oil, coconut oil, partially hydrogenated oil, animal fat, and mixtures thereof. As will be discussed in more detail below, controlling the melting point and viscosity of the center 110 allows for a multilayer edible product 100, 200 with a center 110 that is gooey and homogenous when heated by conventional heating, such as microwave, which results in a desirable mouth feel. The high-melting temperature fat can be added in amounts that help to control the viscosity of the center at varying temperatures. According to embodiments, the content of the high-melting temperature fat in the center 110 may be greater than or equal to 5.0 wt %, such as greater than or equal to 6.0 wt %, greater than or equal to 7.0 wt %, greater than or equal to 8.0 wt %, or greater than or equal to 9.0 wt %. In some embodiments, the maximum content of the high-melting temperature fat in the center 110 may be 10.0 wt %. Accordingly, in embodiments, the content of the high-melting temperature fat in the center 110 may be from greater than or equal to 5.0 wt % to less than or equal to 10.0 wt %, such as from greater than or equal to 6.0 wt % to less than or equal to 10.0 wt %, from greater than or equal to 7.0 wt % to less than or equal to 10.0 wt %, from greater than or equal to 8.0 wt % to less than or equal to 10.0 wt %, or from greater than or equal to 9.0 wt % to less than or equal to 10.0 wt %. In some embodiments, the content of the high-melting temperature fat in the center 110 may be from greater than or equal to 5.0 wt % to less than or equal to 9.0 wt %, from greater than or equal to 5.0 wt % to less than or equal to 8.0 wt %, from greater than or equal to 5.0 wt % to less than or equal to 7.0 wt %, or from greater than or equal to 5.0 wt % to less than or equal to 6.0 wt %. In some embodiments, the content of the high-melting temperature fat in the center 110 may be from greater than or equal to 6.0 wt % to less than or equal to 9.0 wt %, such as from greater than or equal to 7.0 wt % to less than or equal to 8.0 wt %.

A low-melting temperature fat may optionally be added to embodiments of the center 110 Like, the high-melting temperature fat, the low-melting temperature fat can be added to help control the viscosity of the center at various temperatures. Because the low-melting temperature fat melts at low temperatures, it will lower the viscosity of the center at temperatures above its melting point. In embodiments, the low-melting temperature fat may be selected from vegetable oils, peanut oils, sunflower seed oil, olive oil, soybean oil, canola oil, corn oil, cottonseed oil, high oleic oil varieties, algal oil, and mixtures thereof. As stated above, the low-melting temperature fat is an optional component of the center 110, thus in embodiments disclosed and described herein, the center does not include any low-temperature melting fat. Accordingly, in embodiments, the content of the low-temperature melting fat in the center 110 may be greater than or equal to 0.0 wt %, such as greater than or equal to 2.0 wt %, greater than or equal to 5.0 wt %, greater than or equal to 8.0 wt %, greater than or equal to 10.0 wt %, or greater than or equal to 12.0 wt %. In some embodiments, the maximum content of the low-melting temperature fat in the center 110 may be 15.0 wt %. Accordingly, in embodiments, the content of the low-temperature melting fat in the center 110 may be from greater than or equal to 0.0 wt % to less than or equal to 15.0 wt %, such as from greater than or equal to 2.0 wt % to less than or equal to 15.0 wt %, from greater than or equal to 5.0 wt % to less than or equal to 15.0 wt %, from greater than or equal to 8.0 wt % to less than or equal to 15.0 wt %, from greater than or equal to 10.0 wt % to less than or equal to 15.0 wt %, or from greater than or equal to 12.0 wt % to less than or equal to 15.0 wt %. In embodiments, the content of the low-temperature melting fat in the center 110 may be from greater than or equal to 0.0 wt % to less than or equal to 12.0 wt %, such as from greater than or equal to 0.0 wt % to less than or equal to 10.0 wt %, from greater than or equal to 0.0 wt % to less than or equal to 8.0 wt %, from greater than or equal to 0.0 wt % to less than or equal to 5.0 wt %, or from greater than or equal to 0.0 wt % to less than or equal to 2.0 wt %. In some embodiments, the content of the low-melting temperature fat in the center 110 may be from greater than or equal to 2.0 wt % to less than or equal to 12.0 wt %, such as from greater than or equal to 5.0 wt % to less than or equal to 10.0 wt %, or about 8.0 wt %.

The pulverized peanuts, hydrophilic powder, high-melting temperature fat, and, optionally, low-melting temperature fat may be mixed together to form the center 110 by any suitable method. According to embodiments, the pulverized peanuts, hydrophilic powder, high-melting temperature fat, and, optionally, low-melting temperature fat are combined into a vessel and mixed at temperatures sufficient to allow for homogenous mixing of the pulverized peanuts, hydrophilic powder, high-melting temperature fat, and, optionally, low-melting temperature fat. The heating and mixing may be accomplished by conventional techniques and with conventional equipment known in the art. Once the pulverized peanuts, hydrophilic powder, high-melting temperature fat, and, optionally, low-melting temperature fat are combined into a homogenous mixture, the mixture is cooled to room temperature and may be formed into the center 110 by any suitable method and mechanism known in the art. Equipment that can be used for mixing, according to embodiments, includes Hobart mixers, scraped surface mixers, and agitators.

As disclosed above, the content of pulverized peanuts, hydrophilic powder, high-melting temperature fat, and, optionally, low-melting temperature fat in the center 110 may be balanced to control the viscosity of the center 110 at varying temperatures. In addition to controlling the viscosity of the center 110, the content of pulverized peanuts, hydrophilic powder, high-melting temperature fat, and, optionally, low-melting temperature fat in the center 110 may be balanced to control the melting temperature and relaxation time of the center 110. By controlling the viscosity, melting temperature, and relaxation time of the center 110, a center 110 may be formulated so that when the center 110 is heated by conventional heating mechanisms, such as by a microwave, the center 110 turns from semi-solid to a less viscous, gooey center with a good mouth feel.

According to embodiments, the contents of the center 110 may be balanced so that the center 110 has a viscosity less than or equal to 1000 Pa·s at temperatures less than or equal to 35° C., such as a viscosity less than or equal to 1000 Pa·s at temperatures less than or equal to 32° C., a viscosity less than or equal to 1000 Pa·s at temperatures less than or equal to 30° C., or a viscosity less than or equal to 1000 Pa·s at temperatures less than or equal to 28° C. According to embodiments, the minimum temperature at which the center 110 has a viscosity less than or equal to 1000 Pa·s is 25° C. Accordingly, in embodiments the contents of the center 110 may be balanced so that the center 110 has a viscosity less than or equal to 1000 Pa·s at temperatures greater than or equal to 25° C. to less than or equal to 35° C., a viscosity less than or equal to 1000 Pa·s at temperatures greater than or equal to 25° C. to less than or equal to 32° C., a viscosity less than or equal to 1000 Pa·s at temperatures greater than or equal to 25° C. to less than or equal to 30° C., or a viscosity less than or equal to 1000 Pa·s at temperatures greater than or equal to 25° C. to less than or equal to 28° C. In embodiments, the contents of the center 110 may be balanced so that the center 110 has a viscosity less than or equal to 1000 Pa·s at temperatures greater than or equal to 28° C. to less than or equal to 35° C., such as a viscosity less than or equal to 1000 Pa·s at temperatures greater than or equal to 30° C. to less than or equal to 35° C., or a viscosity less than or equal to 1000 Pa·s at temperatures greater than or equal to 32° C. to less than or equal to 35° C. In embodiments, the contents of the center 110 may be balanced so that the center 110 has a viscosity less than or equal to 1000 Pa·s at temperatures greater than or equal to 28° C. to less than or equal to 32° C., as measured by Rheological thermal analysis.

According to embodiments, the contents of the center 110 may be balanced so that the center 110 has a melting temperature of less than or equal to 54° C., such as less than or equal to 52° C., less than or equal to 50° C., less than or equal to 48° C., less than or equal to 45° C., less than or equal to 42° C., less than or equal to 40° C., less than or equal to 38° C., or less than or equal to 35° C., less than or equal to 32° C., or less than or equal to 30° C. According to embodiments, the minimum melting temperature may be 28° C. Accordingly, in embodiments, the contents of the center 110 may be balanced so that the center 110 has a melting temperature from greater than or equal to 28° C. to less than or equal to 54° C., such as greater than or equal to 28° C. to less than or equal to 52° C., from greater than or equal to 28° C. to less than or equal to 50° C., from greater than or equal to 28° C. to less than or equal to 48° C., from greater than or equal to 28° C. to less than or equal to 45° C., from greater than or equal to 28° C. to less than or equal to 42° C., from greater than or equal to 28° C. to less than or equal to 40° C., from greater than or equal to 28° C. to less than or equal to 38° C., from greater than or equal to 28° C. to less than or equal to 35° C., from greater than or equal to 28° C. to less than or equal to 32° C., or from greater than or equal to 28° C. to less than or equal to 30° C. In embodiments, the contents of the center 110 may be balanced so that the center 110 has a melting temperature from greater than or equal to 30° C. to less than or equal to 54° C., such as from greater than or equal to 32° C. to less than or equal to 54° C., from greater than or equal to 35° C. to less than or equal to 54° C., from greater than or equal to 38° C. to less than or equal to 54° C., from greater than or equal to 40° C. to less than or equal to 54° C., from greater than or equal to 42° C. to less than or equal to 54° C., from greater than or equal to 45° C. to less than or equal to 54° C., from greater than or equal to 48° C. to less than or equal to 54° C., from greater than or equal to 50° C. to less than or equal to 54° C., or from greater than or equal to 52° C. to less than or equal to 54° C. In embodiments, the contents of the center 110 may be balanced so that the center 110 has a melting temperature from greater than or equal to 30° C. to less than or equal to 52° C., such as from greater than or equal to 32° C. to less than or equal to 50° C., from greater than or equal to 35° C. to less than or equal to 48° C., from greater than or equal to 38° C. to less than or equal to 45° C., or from greater than or equal to 40° C. to less than or equal to 42° C., as measured by Rheological thermal analysis.

According to embodiments, the contents of the center 110 may be balanced so that the center 110 has a relaxation time, at 37° C., of less than or equal to 0.150 seconds, such as less than or equal to 0.145 seconds, less than or equal to 0.140 seconds, less than or equal to 0.135 seconds, less than or equal to 0.130 seconds, or less than or equal to 0.125 seconds. In embodiments, the minimum relaxation time, at 37° C., is 0.120 seconds. Accordingly, in embodiments, the contents of the center 110 may be balanced so that the center 110 has a relaxation time, at 37° C., from greater than or equal to 0.120 seconds to less than or equal to 0.150 seconds, from greater than or equal to 0.120 seconds to less than or equal to 0.145 seconds, from greater than or equal to 0.120 seconds to less than or equal to 0.140 seconds, from greater than or equal to 0.120 seconds to less than or equal to 0.135 seconds, from greater than or equal to 0.120 seconds to less than or equal to 0.130 seconds, or from greater than or equal to 0.120 seconds to less than or equal to 0.125 seconds. In embodiments, the contents of the center 110 may be balanced so that the center 110 has a relaxation time, at 37° C., from greater than or equal to 0.125 seconds to less than or equal to 0.150 seconds, such as from greater than or equal to 0.130 seconds to less than or equal to 0.150 seconds, from greater than or equal to 0.135 seconds to less than or equal to 0.150 seconds, from greater than or equal to 0.140 seconds to less than or equal to 0.150 seconds, or from greater than or equal to 0.145 seconds to less than or equal to 0.150 seconds. In embodiments, the contents of the center 110 may be balanced so that the center 110 has a relaxation time, at 37° C., from greater than or equal to 0.130 seconds to less than or equal to 0.145 seconds, such as from greater than or equal to 0.135 seconds to less than or equal to 0.140 seconds, as measured by Rheological thermal analysis.

Almond-Based Center

In embodiments where the center comprises almonds, the almonds are pulverized into a desired particle size. As should be understood, the particle size of the pulverized almonds will affect the consistency and overall mouth feel of the center 110 of the multilayer edible product 100, 200. For instance, if the particle size of the almonds is too large, the center will be gritty, have an unpleasant mouth feel, and will not melt homogeneously. In embodiments, the almonds may be pulverized by any conventional mechanism, such as grinding, milling, pressing, jet milling, food processing, mortar and pestle, and the like. According to embodiments, the almonds may be pulverized such that a medium particle size distribution, $D_{50}$, as measured by laser diffraction, is less than or equal to 20.0 μm, such as less than or equal to 18.0 μm, less than or equal to 15.0 μm, less than or equal to 12.0 μm, less than or equal to 10.0 μm, less than or equal to 8.0 μm, or less than or equal to 5.0 μm. Thus, according to embodiments, the almonds may be pulverized such that a medium particle size distribution, $D_{50}$, is from greater than or equal to 2.0 μm to less than or equal to 20.0 μm, such as from greater than or equal to 5.0 μm to less than or equal to 18.0 μm, from greater than or equal to 10.0 μm to less than or equal to 16.0 μm, or from greater than or equal to 12.0 μm to less than or equal to 14.0 μm, or about 15 μm.

According to embodiments, the almonds may be pulverized such that a particle size distribution, $D_{90}$, as measured by laser diffraction, is less than or equal to 45.0 μm, such as less than or equal to 42.0 μm, less than or equal to 40.0 μm, less than or equal to 38.0 μm, or less than or equal to 35.0 μm. Thus, according to embodiments, the almonds may be pulverized such that a particle size distribution, $D_{90}$, is from greater than or equal to 30.0 μm to less than or equal to 45.0 μm, such as from greater than or equal to 35.0 μm to less than or equal to 42.0 μm, or from greater than or equal to 38.0 μm to less than or equal to 40.0 μm.

In embodiments where the center 110 comprises pulverized almonds, the center 110 may also comprise other components, such as hydrophilic powder, high-melting temperature fat, and optionally, low-temperature melting fat. According to embodiments, the center may be an almond-based center comprising greater than or equal to 53.0 wt % pulverized almonds (as described above), greater than or equal to 10.0 wt % hydrophilic powder, greater than or equal to 5.0 wt % high-melting temperature fat, and greater than or equal to 0.0 wt % low-melting temperature fat. Each of the hydrophilic powder, high-melting temperature fat, and low-melting temperature fat will be described in more detail below.

According to embodiments, the center 110 may comprise greater than or equal to 53.0 wt % pulverized almonds, such as greater than or equal to 55.0 wt % pulverized almonds, greater than or equal to 58.0 wt % pulverized almonds, greater than or equal to 60.0 wt % pulverized almonds, greater than or equal to 62.0 wt % pulverized almonds, greater than or equal to 65.0 wt % pulverized almonds, or greater than or equal to 68.0 wt % pulverized almonds. For each of the above ranges, the maximum content of pulverized almonds present in the center may be, according to embodiments, 70.0 wt %. Accordingly, in embodiments, the content of pulverized almonds in the center may be from greater than or equal to 53.0 wt % to less than or equal to 70.0 wt %, such as from greater than or equal to 55.0 wt % to less than or equal to 70.0 wt %, from greater than or equal to 58.0 wt % to less than or equal to 70.0 wt %, from greater than or equal to 60.0 wt % to less than or equal to 70.0 wt %, from greater than or equal to 62.0 wt % to less than or equal to 70.0 wt %, from greater than or equal to 65.0 wt % to less than or equal to 70.0 wt %, or from greater than or equal to 68.0 wt % to less than or equal to 70.0 wt %. In embodiments, the content of pulverized almonds in the center may be from greater than or equal to 53.0 wt % to less than or equal to 68.0 wt %, such as from greater than or equal to 53.0 wt % to less than or equal to 65.0 wt %, from greater than or equal to 53.0 wt % to less than or equal to 62.0 wt %, from greater than or equal to 53.0 wt % to less than or equal to 60.0 wt %, from greater than or equal to 53.0 wt % to less than or equal to 58.0 wt %, or from greater than or equal to 53.0 wt % to less than or equal to 55.0 wt %. In some embodiments, the content of pulverized almonds in the center may be from greater than or equal to 55.0 wt % to less than or equal to 68.0 wt %, such as from greater than or equal to 58.0 wt % to less than or equal to 65.0 wt %, or from greater than or equal to 60.0 wt % to less than or equal to 62.0 wt %.

As disclosed above, the center 110 may comprise a hydrophilic powder. The hydrophilic powder may, according to embodiments, be powdered sugar, flour, salt, and mixtures thereof. The hydrophilic powder may absorb some of the fat and/or moisture in the center 110, which can mitigate some of the migration of fat and/or moisture from the center 110 to the outer layer 130. In addition, the hydrophilic powder may improve the homogeneity of the center 110 composition and provide improved mouth feel. However, if too much hydrophilic powder is added to the center 110, the hydrophilic powder may reduce the moisture of the center 110 to a level that is undesirable, and may prevent the center 110 from melting to a desirable amount. Accordingly, in embodiments, the content of hydrophilic powder in the center 110 is greater than or equal to 10.0%, such as greater than or equal to 11.0 wt %, greater than or equal to 12.0 wt %, greater than or equal to 13.0 wt %, greater than or equal to 14.0 wt %, greater than or equal to 15.0 wt %, greater than or equal to 16.0 wt %, greater than or equal to 17.0 wt %, greater than or equal to 18.0 wt %, or greater than or equal to 19.0 wt %. In some embodiments, the maximum content of the hydrophilic powder in the center 110 may be 20.0 wt %. Accordingly, in some embodiments, the content of hydrophilic powder in the center 110 is from greater than or equal to 10.0 wt % to less than or equal to 20.0 wt %, such as from greater than or equal to 11.0 wt % to less than or equal to 20.0 wt %, from greater than or equal to 12.0 wt % to less than or equal to 20.0 wt %, from greater than or equal to 13.0 wt % to less than or equal to 20.0 wt %, from greater than or equal to 14.0 wt % to less than or equal to 20.0 wt %, from greater than or equal to 15.0 wt % to less than or equal to 20.0 wt %, from greater than or equal to 16.0 wt % to less than or equal to 20.0 wt %, from greater than or equal to 17.0 wt % to less than or equal to 20.0 wt %, from greater than or equal to 18.0 wt % to less than or equal to 20.0 wt %, or from greater than or equal to 19.0 wt % to less than or equal to 20.0 wt %. In some embodiments, the content of hydrophilic powder in the center 110 is from greater than or equal to 10.0 wt % to less than or equal to 19.0 wt %, such as from greater than or equal to 10.0 wt % to less than or equal to 18.0 wt %, from greater than or equal to 10.0 wt % to less than or equal to 17.0 wt %, from greater than or equal to 10.0 wt % to less than or equal to 16.0 wt %, from greater than or equal to 10.0 wt % to less than or equal to 15.0 wt %, from greater than or equal to 10.0 wt % to less than or equal to 14.0 wt %, from greater than or equal to 10.0 wt % to less than or equal to 13.0 wt %, from greater than or equal to 10.0 wt % to less than or equal to 12.0 wt %, or from greater than or equal to 10.0 wt % to less than or equal to 11.0 wt %. In embodiments, the content of hydrophilic powder in the center 110 is from greater than or equal to 11.0 wt % to less than or equal to 19.0 wt %, such as from greater than or equal to 12.0 wt % to less than or equal to 18.0 wt %, from greater than or equal to 13.0 wt % to less than or equal to 17.0 wt %, or from greater than or equal to 14.0 wt % to less than or equal to 16.0 wt %.

According to embodiments, the center 110 may further comprise a high-melting temperature fat. In embodiments, the high-melting temperature fat may be selected from palm oil (such as, for example, Revel™ A manufactured by Loders Croklaan), fractionated palm oil, double fractionated palm oil, fully hydrogenated coconut palm and palm kernel oils, palm kernel oil, interesterfied vegetable oil, coconut oil, partially hydrogenated oil, animal fat, and mixtures thereof. As will be discussed in more detail below, controlling the melting point and viscosity of the center 110 allows for a multilayer edible product 100, 200 with a center 110 that is gooey and homogenous when heated by conventional heating, such as microwave, which results in a desirable mouth feel. The high-melting temperature fat can be added in amounts that help to control the viscosity of the center at varying temperatures. According to embodiments, the content of the high-melting temperature fat in the center 110 may be greater than or equal to 5.0 wt %, such as greater than or equal to 6.0 wt %, greater than or equal to 7.0 wt %, greater than or equal to 8.0 wt %, or greater than or equal to 9.0 wt %. In some embodiments, the maximum content of the high-melting temperature fat in the center 110 may be 10.0 wt %. Accordingly, in embodiments, the content of the high-melting temperature fat in the center 110 may be from greater than or equal to 5.0 wt % to less than or equal to 10.0 wt %, such as from greater than or equal to 6.0 wt % to less than or equal to 10.0 wt %, from greater than or equal to 7.0 wt % to less than or equal to 10.0 wt %, from greater than or equal to 8.0 wt % to less than or equal to 10.0 wt %, or from greater than or equal to 9.0 wt % to less than or equal to 10.0 wt %. In some embodiments, the content of the high-melting temperature fat in the center 110 may be from greater than or equal to 5.0 wt % to less than or equal to 9.0 wt %, from greater than or equal to 5.0 wt % to less than or equal to 8.0 wt %, from greater than or equal to 5.0 wt % to less than or equal to 7.0 wt %, or from greater than or equal to 5.0 wt % to less than or equal to 6.0 wt %. In some embodiments, the content of the high-melting temperature fat in the center 110 may be from greater than or equal to 6.0 wt % to less than or equal to 9.0 wt %, such as from greater than or equal to 7.0 wt % to less than or equal to 8.0 wt %.

A low-melting temperature fat may optionally be added to embodiments of the center 110 Like, the high-melting temperature fat, the low-melting temperature fat can be added to help control the viscosity of the center at various temperatures. Because the low-melting temperature fat melts at low temperatures, it will lower the viscosity of the center at temperatures above its melting point. In embodiments, the low-melting temperature fat may be selected from vegetable oils, peanut oils, sunflower seed oil, olive oil, soybean oil, canola oil, corn oil, cottonseed oil, high oleic oil varieties, algal oil, and mixtures thereof. As stated above, the low-melting temperature fat is an optional component of the center 110, thus in embodiments disclosed and described herein, the center does not include any low-temperature melting fat. Accordingly, in embodiments, the content of the low-temperature melting fat in the center 110 may be greater than or equal to 0.0 wt %, such as greater than or equal to 2.0 wt %, greater than or equal to 5.0 wt %, greater than or equal to 8.0 wt %, greater than or equal to 10.0 wt %, or greater than or equal to 12.0 wt %. In some embodiments, the maximum content of the low-melting temperature fat in the center 110 may be 15.0 wt %. Accordingly, in embodiments, the content of the low-temperature melting fat in the center 110 may be from greater than or equal to 0.0 wt % to less than or equal to 15.0 wt %, such as from greater than or equal to 2.0 wt % to less than or equal to 15.0 wt %, from greater than or equal to 5.0 wt % to less than or equal to 15.0 wt %, from greater than or equal to 8.0 wt % to less than or equal to 15.0 wt %, from greater than or equal to 10.0 wt % to less than or equal to 15.0 wt %, or from greater than or equal to 12.0 wt % to less than or equal to 15.0 wt %. In embodiments, the content of the low-temperature melting fat in the center 110 may be from greater than or equal to 0.0 wt % to less than or equal to 12.0 wt %, such as from greater than or equal to 0.0 wt % to less than or equal to 10.0 wt %, from greater than or equal to 0.0 wt % to less than or equal to 8.0 wt %, from greater than or equal to 0.0 wt % to less than or equal to 5.0 wt %, or from greater than or equal to 0.0 wt % to less than or equal to 2.0 wt %. In some embodiments, the content of the low-temperature melting fat in the center 110 may be from greater than or equal to 2.0 wt % to less than or equal to 12.0 wt %, such as from greater than or equal to 5.0 wt % to less than or equal to 10.0 wt %, or about 8.0 wt %.

The pulverized almonds, hydrophilic powder, high-melting temperature fat, and, optionally, low-melting temperature fat may be mixed together to form the center 110 by any suitable method. According to embodiments, the pulverized almonds, hydrophilic powder, high-melting temperature fat, and, optionally, low-melting temperature fat are combined into a vessel and mixed at temperatures sufficient to allow for homogenous mixing of the pulverized almonds, hydrophilic powder, high-melting temperature fat, and, optionally, low-melting temperature fat. The heating and mixing may be accomplished by conventional techniques and with conventional equipment known in the art. Once the pulverized almonds, hydrophilic powder, high-melting temperature fat, and, optionally, low-melting temperature fat are combined into a homogenous mixture, the mixture is cooled to room temperature and may be formed into the center 110 by any suitable method and mechanism known in the art. Equipment that can be used for mixing, according to embodiments, includes Hobart mixers, scraped surface mixers and agitators.

As disclosed above, the content of pulverized almonds, hydrophilic powder, high-melting temperature fat, and, optionally, low-melting temperature fat in the center 110 may be balanced to control the viscosity of the center 110 at varying temperatures. In addition to controlling the viscosity of the center 110, the content of pulverized almonds, hydrophilic powder, high-melting temperature fat, and, optionally, low-melting temperature fat in the center 110 may be balanced to control the melting temperature and relaxation time of the center 110. By controlling the viscosity, melting temperature, and relaxation time of the center 110, a center 110 may be formulated so that when the center 110 is heated by conventional heating mechanisms, such as by a microwave, the center 110 turns from semi-solid to a less viscous, gooey center with a good mouth feel.

According to embodiments, the contents of the center 110 may be balanced so that the center 110 has a viscosity less than or equal to 1000 Pa·s at temperatures less than or equal to 50° C., such as less than or equal to 1000 Pa·s at temperatures less than or equal to 48° C., less than or equal to 1000 Pa·s at temperatures less than or equal to 45° C., a viscosity less than or equal to 1000 Pa·s at temperatures less than or equal to 42° C., a viscosity less than or equal to 1000 Pa·s at temperatures less than or equal to 40° C., a viscosity less than or equal to 1000 Pa·s at temperatures less than or equal to 38° C., a viscosity less than or equal to 1000 Pa·s at temperatures less than or equal to 35° C., a viscosity less than or equal to 1000 Pa·s at temperatures less than or equal to 32° C., or a viscosity less than or equal to 1000 Pa·s at temperatures less than or equal to 30° C. According to embodiments, the minimum temperature at which the center 110 has a viscosity less than or equal to 1000 Pa·s is 25° C. Accordingly, in embodiments the contents of the center 110 may be balanced so that the center 110 has a viscosity less than or equal to 1000 Pa·s at temperatures greater than or equal to 25° C. to less than or equal to 50° C., such as a viscosity less than or equal to 1000 Pa·s at temperatures greater than or equal to 25° C. to less than or equal to 48° C., a viscosity less than or equal to 1000 Pa·s at temperatures greater than or equal to 25° C. to less than or equal to 45° C., a viscosity less than or equal to 1000 Pa·s at temperatures greater than or equal to 25° C. to less than or equal to 42° C., a viscosity less than or equal to 1000 Pa·s at temperatures greater than or equal to 25° C. to less than or equal to 40° C., a viscosity less than or equal to 1000 Pa·s at temperatures greater than or equal to 25° C. to less than or equal to 38° C., a viscosity less than or equal to 1000 Pa·s at temperatures greater than or equal to 25 ° C. to less than or equal to 35° C., a viscosity less than or equal to 1000 Pa·s at temperatures greater than or equal to 25° C. to less than or equal to 32° C., or a viscosity less than or equal to 1000 Pa·s at temperatures greater than or equal to 25° C. to less than or equal to 30° C. In embodiments, the contents of the center 110 may be balanced so that the center 110 has a viscosity less than or equal to 1000 Pa·s at temperatures greater than or equal to 28° C. to less than or equal to 50° C., such as a viscosity less than or equal to 1000 Pa·s at temperatures greater than or equal to 30° C. to less than or equal to 50° C., a viscosity less than or equal to 1000 Pa·s at temperatures greater than or equal to 32° C. to less than or equal to 50° C., a viscosity less than or equal to 1000 Pa·s at temperatures greater than or equal to 35° C. to less than or equal to 50° C., a viscosity less than or equal to 1000 Pa·s at temperatures greater than or equal to 38° C. to less than or equal to 50° C., a viscosity less than or equal to 1000 Pa·s at temperatures greater than or equal to 40° C. to less than or equal to 50° C., a viscosity less than or equal to 1000 Pa·s at temperatures greater than or equal to 42° C. to less than or equal to 50° C., a viscosity less than or equal to 1000 Pa·s at temperatures greater than or equal to 45° C. to less than or equal to 50° C., or a viscosity less than or equal to 1000 Pa·s at temperatures greater than or equal to 48° C. to less than or equal to 50° C. In embodiments, the contents of the center 110 may be balanced so that the center 110 has a viscosity less than or equal to 1000 Pa·s at temperatures greater than or equal to 28° C. to less than or equal to 48° C., such as a viscosity less than or equal to 1000 Pa·s at temperatures greater than or equal to 30° C. to less than or equal to 45° C., a viscosity less than or equal to 1000 Pa·s at temperatures greater than or equal to 32° C. to less than or equal to 42° C., or a viscosity less than or equal to 1000 Pa·s at temperatures greater than or equal to 35° C. to less than or equal to 40° C., as measured by Rheological thermal analysis.

According to embodiments, the contents of the center 110 may be balanced so that the center 110 has a melting temperature of less than or equal to 57° C., such as less than or equal to 55° C., less than or equal to 52° C., less than or equal to 50° C., less than or equal to 48° C., less than or equal to 45° C., less than or equal to 42° C., less than or equal to 40° C., less than or equal to 38° C., or less than or equal to 35° C., less than or equal to 32° C., or less than or equal to 30° C. According to embodiments, the minimum melting temperature may be 28° C. Accordingly, in embodiments, the contents of the center 110 may be balanced so that the center 110 has a melting temperature from greater than or equal to 28° C. to less than or equal to 57° C., such as from greater than or equal to 28° C. to less than or equal to 55° C., from greater than or equal to 28° C. to less than or equal to 52° C., from greater than or equal to 28 ° C. to less than or equal to 50° C., from greater than or equal to 28° C. to less than or equal to 48° C., from greater than or equal to 28° C. to less than or equal to 45° C., from greater than or equal to 28° C. to less than or equal to 42° C., from greater than or equal to 28° C. to less than or equal to 40° C., from greater than or equal to 28° C. to less than or equal to 38° C., from greater than or equal to 28° C. to less than or equal to 35° C., from greater than or equal to 28 ° C. to less than or equal to 32° C., or from greater than or equal to 28° C. to less than or equal to 30° C. In embodiments, the contents of the center 110 may be balanced so that the center 110 has a melting temperature from greater than or equal to 30° C. to less than or equal to 57° C., such as from greater than or equal to 32° C. to less than or equal to 57° C., from greater than or equal to 35° C. to less than or equal to 57° C., from greater than or equal to 38° C. to less than or equal to 57° C., from greater than or equal to 40° C. to less than or equal to 57° C., from greater than or equal to 42° C. to less than or equal to 57° C., from greater than or equal to 45° C. to less than or equal to 57° C., from greater than or equal to 48° C. to less than or equal to 57° C., from greater than or equal to 50° C. to less than or equal to 57° C., from greater than or equal to 52° C. to less than or equal to 57° C., or from greater than or equal to 55° C. to less than or equal to 57° C. In embodiments, the contents of the center 110 may be balanced so that the center 110 has a melting temperature from greater than or equal to 30° C. to less than or equal to 55° C., such as from greater than or equal to 32° C. to less than or equal to 52° C., from greater than or equal to 35° C. to less than or equal to 50° C., from greater than or equal to 38° C. to less than or equal to 48° C., or from greater than or equal to 40° C. to less than or equal to 45° C., as measured by Rheological thermal analysis.

According to embodiments, the contents of the center 110 may be balanced so that the center 110 has a relaxation time, at 37° C., of less than or equal to 0.165 seconds, such as less than or equal to 0.160 seconds, less than or equal to 0.155 seconds, less than or equal to 0.150 seconds, less than or equal to 0.145 seconds, less than or equal to 0.140 seconds, less than or equal to 0.135 seconds, less than or equal to 0.130 seconds, or less than or equal to 0.125 seconds. In embodiments, the minimum relaxation time, at 37° C., is 0.120 seconds. Accordingly, in embodiments, the contents of the center 110 may be balanced so that the center 110 has a relaxation time, at 37° C., from greater than or equal to 0.120 seconds to less than or equal to 0.165 seconds, such as from greater than or equal to 0.120 seconds to less than or equal to 0.160 seconds, from greater than or equal to 0.120 seconds to less than or equal to 0.155 seconds, from greater than or equal to 0.120 seconds to less than or equal to 0.150 seconds, from greater than or equal to 0.120 seconds to less than or equal to 0.145 seconds, from greater than or equal to 0.120 seconds to less than or equal to 0.140 seconds, from greater than or equal to 0.120 seconds to less than or equal to 0.135 seconds, from greater than or equal to 0.120 seconds to less than or equal to 0.130 seconds, or from greater than or equal to 0.120 seconds to less than or equal to 0.125 seconds. In embodiments, the contents of the center 110 may be balanced so that the center 110 has a relaxation time, at 37° C., from greater than or equal to 0.125 seconds to less than or equal to 0.165 seconds, such as from greater than or equal to 0.130 seconds to less than or equal to 0.165 seconds, from greater than or equal to 0.135 seconds to less than or equal to 0.165 seconds, from greater than or equal to 0.140 seconds to less than or equal to 0.165 seconds, from greater than or equal to 0.145 seconds to less than or equal to 0.165 seconds, from greater than or equal to 0.150 seconds to less than or equal to 0.165 seconds, from greater than or equal to 0.155 seconds to less than or equal to 0.165 seconds, or from greater than or equal to 0.160 seconds to less than or equal to 0.165 seconds. In embodiments, the contents of the center 110 may be balanced so that the center 110 has a relaxation time, at 37° C., from greater than or equal to 0.130 seconds to less than or equal to 0.160 seconds, such as from greater than or equal to 0.135 seconds to less than or equal to 0.155 seconds, or from greater than or equal to 0.140 seconds to less than or equal to 0.150 seconds, as measured by Rheological thermal analysis.

Barrier Layer

As described above, embodiments of a multilayer edible product 100, 200 according to embodiments comprises a barrier layer 120 positioned between the center 110 and the outer layer 130. One function of the barrier layer 120 is to prevent migration of fat and/or moisture from the center 110 to the outer layer 130. Accordingly, the barrier layer 120 of embodiments is formulated to prevent this migration of fat and/or moisture. According to embodiments, the barrier layer comprises a hydrophilic powder, a source of fat, and, optionally, water. In embodiments, the composition of the barrier layer 120 is different from the composition of the center 110 and the composition of the outer layer 130.

As described above, the barrier layer 120 comprises a hydrophilic powder. The hydrophilic powder may, according to embodiments, be powdered sugar, flour, salt, and mixtures thereof. The hydrophilic powder may absorb some of the fat and/or moisture in the center 110, mitigates the migration of fat and/or moisture from the center 110 to the outer layer 130. According to embodiments, the barrier layer 120 comprises greater than or equal to 30.0 wt % hydrophilic powder, such as greater than or equal to 32.0 wt % hydrophilic powder, greater than or equal to 35.0 wt % hydrophilic powder, greater than or equal to 38.0 wt % hydrophilic powder, greater than or equal to 40.0 wt % hydrophilic powder, greater than or equal to 42.0 wt % hydrophilic powder, greater than or equal to 45.0 wt % hydrophilic powder, greater than or equal to 48.0 wt % hydrophilic powder, greater than or equal to 50.0 wt % hydrophilic powder, greater than or equal to 52.0 wt % hydrophilic powder, greater than or equal to 55.0 wt % hydrophilic powder, greater than or equal to 58.0 wt % hydrophilic powder, greater than or equal to 60.0 wt % hydrophilic powder, greater than or equal to 62.0 wt % hydrophilic powder, or greater than or equal to 65.0 wt % hydrophilic powder. In some embodiments, the maximum content of hydrophilic powder in the barrier layer 120 is 70.0 wt %. Accordingly, in embodiments, the content of hydrophilic powder in the barrier layer is from greater than or equal to 30.0 wt % to less than or equal to 70.0 wt %, such as from greater than or equal to 32.0 wt % to less than or equal to 70.0 wt %, from greater than or equal to 35.0 wt % to less than or equal to 70.0 wt %, from greater than or equal to 38.0 wt % to less than or equal to 70.0 wt %, from greater than or equal to 40.0 wt % to less than or equal to 70.0 wt %, from greater than or equal to 42.0 wt % to less than or equal to 70.0 wt %, from greater than or equal to 45.0 wt % to less than or equal to 70.0 wt %, from greater than or equal to 48.0 wt % to less than or equal to 70.0 wt %, from greater than or equal to 50.0 wt % to less than or equal to 70.0 wt %, from greater than or equal to 52.0 wt % to less than or equal to 70.0 wt %, from greater than or equal to 55.0 wt % to less than or equal to 70.0 wt %, from greater than or equal to 58.0 wt % to less than or equal to 70.0 wt %, from greater than or equal to 60.0 wt % to less than or equal to 70.0 wt %, from greater than or equal to 65.0 wt % to less than or equal to 70.0 wt %, or from greater than or equal to 68.0 wt % to less than or equal to 70.0 wt %. In embodiments, the content of hydrophilic powder in the barrier layer is from greater than or equal to 30.0 wt % to less than or equal to 68.0 wt %, such as from greater than or equal to 30.0 wt % to less than or equal to 65.0 wt %, from greater than or equal to 30.0 wt % to less than or equal to 62.0 wt %, from greater than or equal to 30.0 wt % to less than or equal to 60.0 wt %, from greater than or equal to 30.0 wt % to less than or equal to 58.0 wt %, from greater than or equal to 30.0 wt % to less than or equal to 55.0 wt %, from greater than or equal to 30.0 wt % to less than or equal to 52.0 wt %, from greater than or equal to 30.0 wt % to less than or equal to 50.0 wt %, from greater than or equal to 30.0 wt % to less than or equal to 48.0 wt %, from greater than or equal to 30.0 wt % to less than or equal to 45.0 wt %, from greater than or equal to 30.0 wt % to less than or equal to 42.0 wt %, from greater than or equal to 30.0 wt % to less than or equal to 40.0 wt %, from greater than or equal to 30.0 wt % to less than or equal to 38.0 wt %, from greater than or equal to 30.0 wt % to less than or equal to 35.0 wt %, or from greater than or equal to 30.0 wt % to less than or equal to 32.0 wt %. In embodiments, the content of hydrophilic powder in the barrier layer is from greater than or equal to 32.0 wt % to less than or equal to 68.0 wt %, such as from greater than or equal to 35.0 wt % to less than or equal to 65.0 wt %, from greater than or equal to 38.0 wt % to less than or equal to 62.0 wt %, from greater than or equal to 40.0 wt % to less than or equal to 60.0 wt %, from greater than or equal to 42.0 wt % to less than or equal to 58.0 wt %, or from greater than or equal to 45.0 wt % to less than or equal to 55.0 wt %.

As described above, the barrier layer 120, according to embodiments, comprises a fat source. In embodiments, the fat source may be a solid fat. In some embodiments, the solid fat may be selected palm oil (such as, for example, Revel ™ A manufactured by Loders Croklaan), fractionated palm oil, double fractionated palm oil, fully hydrogenated coconut palm and palm kernel oils, palm kernel oil, interesterfied vegetable oil, coconut oil, partially hydrogenated oil, animal fat, and mixtures thereof. In embodiments, the content of the fat source in the barrier layer 120 may be greater than or equal to 5.0 wt %, such as greater than or equal to 8.0 wt %, greater than or equal to 10.0 wt %, greater than or equal to 12.0 wt %, greater than or equal to 15.0 wt %, or greater than or equal to 18.0 wt %. In embodiments, the maximum content of the fat source in the barrier layer 120 is 20.0 wt %. Accordingly, in some embodiments, the content of the fat source in the barrier layer 120 is from greater than or equal to 5.0 wt % to less than or equal to 20.0 wt %, such as from greater than or equal to 8.0 wt % to less than or equal to 20.0 wt %, from greater than or equal to 10.0 wt % to less than or equal to 20.0 wt %, from greater than or equal to 12.0 wt % to less than or equal to 20.0 wt %, from greater than or equal to 15.0 wt % to less than or equal to 20.0 wt %, or from greater than or equal to 18.0 wt % to less than or equal to 20.0 wt %. In some embodiments, the content of the fat source in the barrier layer 120 is from greater than or equal to 5.0 wt % to less than or equal to 18.0 wt %, such as from greater than or equal to 5.0 wt % to less than or equal to 15.0 wt %, from greater than or equal to 5.0 wt % to less than or equal to 12.0 wt %, from greater than or equal to 5.0 wt % to less than or equal to 10.0 wt %, or from greater than or equal to 5.0 wt % to less than or equal to 8.0 wt %. In some embodiments, the content of the fat source in the barrier layer 120 is from greater than or equal to 8.0 wt % to less than or equal to 18.0 wt %, such as from greater than or equal to 10.0 wt % to less than or equal to 15.0 wt %.

As described above, in embodiments, the barrier layer 120 optionally comprises water. The content of the water in the barrier layer 120 according to embodiments may be greater than or equal to 0.0 wt %, such as greater than or equal to 5.0 wt %, greater than or equal to 10.0 wt %, greater than or equal to 15.0 wt %, greater than or equal to 20.0 wt %, greater than or equal to 25.0 wt %, greater than or equal to 30.0 wt %, greater than or equal to 35.0 wt %, greater than or equal to 40.0 wt %, or greater than or equal to 45.0 wt %. In embodiments, the maximum content of water in the barrier layer 120 is 60.0 wt %. Accordingly, in embodiments, the content of water in the barrier layer 120 is from greater than or equal to 0.0 wt % to less than or equal to 60.0 wt %, such as from greater than or equal to 5.0 wt % to less than or equal to 60.0 wt %, from greater than or equal to 10.0 wt % to less than or equal to 60.0 wt %, from greater than or equal to 15.0 wt % to less than or equal to 60.0 wt %, from greater than or equal to 20.0 wt % to less than or equal to 60.0 wt %, from greater than or equal to 25.0 wt % to less than or equal to 60.0 wt %, from greater than or equal to 30.0 wt % to less than or equal to 60.0 wt %, from greater than or equal to 35.0 wt % to less than or equal to 60.0 wt %, from greater than or equal to 40.0 wt % to less than or equal to 60.0 wt %, from greater than or equal to 45.0 wt % to less than or equal to 60.0 wt %, from greater than or equal to 50.0 wt % to less than or equal to 60.0 wt %, or from greater than or equal to 55.0 wt % to less than or equal to 60.0 wt %. In embodiments, the content of water in the barrier layer 120 is from greater than or equal to 0.0 wt % to less than or equal to 55.0 wt %, such as from greater than or equal to 0.0 wt % to less than or equal to 50.0 wt %, from greater than or equal to 0.0 wt % to less than or equal to 45.0 wt %, from greater than or equal to 0.0 wt % to less than or equal to 40.0 wt %, from greater than or equal to 0.0 wt % to less than or equal to 35.0 wt %, from greater than or equal to 0.0 wt % to less than or equal to 30.0 wt %, from greater than or equal to 0.0 wt % to less than or equal to 25.0 wt %, from greater than or equal to 0.0 wt % to less than or equal to 20.0 wt %, from greater than or equal to 0.0 wt % to less than or equal to 15.0 wt %, from greater than or equal to 0.0 wt % to less than or equal to 10.0 wt %, or from greater than or equal to 0.0 wt % to less than or equal to 5.0 wt %. In embodiments, the content of water in the barrier layer 120 is from greater than or equal to 5.0 wt % to less than or equal to 55.0 wt %, such as from greater than or equal to 10.0 wt % to less than or equal to 50.0 wt %, from greater than or equal to 15.0 wt % to less than or equal to 45.0 wt %, from greater than or equal to 20.0 wt % to less than or equal to 40.0 wt %, or from greater than or equal to 25.0 wt % to less than or equal to 35.0 wt %.

According to embodiments, the barrier layer 120 may, optionally, comprise one or more additional components, such as sweeteners (sugar or stevia), artificial or natural flavor (liquid or powder), colorants (such as FD&C colors), acidulants (such as granular citric acid, malic acid), molasses, preservatives (such as sodium benzoate). According to embodiments, the content of the one or more additional components may be greater than or equal to 0.0 wt %, such as greater than or equal to 2.0 wt %, greater than or equal to 5.0 wt %, greater than or equal to 8.0 wt %, greater than or equal to 10.0 wt %, greater than or equal to 12.0 wt %, greater than or equal to 15.0 wt %, greater than or equal to 18.0 wt %, greater than or equal to 20.0 wt %, greater than or equal to 22.0 wt %, or greater than or equal to 25.0 wt %. In embodiments, the maximum content of the one or more additional component in the barrier layer 120 is 40.0 wt %. Accordingly, in some embodiments, the content of the one or more additional components in the barrier layer 120 is from greater than or equal to 0.0 wt % to less than or equal to 40.0 wt %, such as from greater than or equal to 2.0 wt % to less than or equal to 40.0 wt %, from greater than or equal to 5.0 wt % to less than or equal to 40.0 wt %, from greater than or equal to 8.0 wt % to less than or equal to 40.0 wt %, from greater than or equal to 10.0 wt % to less than or equal to 40.0 wt %, from greater than or equal to 12.0 wt % to less than or equal to 40.0 wt %, from greater than or equal to 15.0 wt % to less than or equal to 40.0 wt %, from greater than or equal to 18.0 wt % to less than or equal to 40.0 wt %, from greater than or equal to 20.0 wt % to less than or equal to 40.0 wt %, from greater than or equal to 22.0 wt % to less than or equal to 40.0 wt %, from greater than or equal to 25.0 wt % to less than or equal to 40.0 wt %, from greater than or equal to 28.0 wt % to less than or equal to 40.0 wt %, from greater than or equal to 30.0 wt % to less than or equal to 40.0 wt %, from greater than or equal to 32.0 wt % to less than or equal to 40.0 wt %, from greater than or equal to 35.0 wt % to less than or equal to 40.0 wt %, or from greater than or equal to 38.0 wt % to less than or equal to 40.0 wt %. In embodiments, the content of the one or more additional components in the barrier layer 120 is from greater than or equal to 0.0 wt % to less than or equal to 38.0 wt %, such as greater than or equal to 0.0 wt % to less than or equal to 35.0 wt %, greater than or equal to 0.0 wt % to less than or equal to 32.0 wt %, greater than or equal to 0.0 wt % to less than or equal to 30.0 wt %, greater than or equal to 0.0 wt % to less than or equal to 28.0 wt %, greater than or equal to 0.0 wt % to less than or equal to 25.0 wt %, greater than or equal to 0.0 wt % to less than or equal to 22.0 wt %, greater than or equal to 0.0 wt % to less than or equal to 20.0 wt %, greater than or equal to 0.0 wt % to less than or equal to 18.0 wt %, greater than or equal to 0.0 wt % to less than or equal to 15.0 wt %, greater than or equal to 0.0 wt % to less than or equal to 12.0 wt %, greater than or equal to 0.0 wt % to less than or equal to 10.0 wt %, greater than or equal to 0.0 wt % to less than or equal to 8.0 wt %, greater than or equal to 0.0 wt % to less than or equal to 5.0 wt %, or greater than or equal to 0.0 wt % to less than or equal to 2.0 wt %. In embodiments, the content of the one or more additional components in the barrier layer 120 is from greater than or equal to 2.0 wt % to less than or equal to 38.0 wt %, such as from greater than or equal to 5.0 wt % to less than or equal to 35.0 wt %, from greater than or equal to 8.0 wt % to less than or equal to 32.0 wt %, from greater than or equal to 10.0 wt % to less than or equal to 30.0 wt %, from greater than or equal to 12.0 wt % to less than or equal to 28.0 wt %, from greater than or equal to 15.0 wt % to less than or equal to 25.0 wt %, or from greater than or equal to 18.0 wt % to less than or equal to 22.0 wt %. It should be understood that the above ranges are weight percentages of all additional components (such as, for example, the sum of sweeteners, flavors, and colorants) relative the total composition of the barrier layer.

According to some embodiments, the barrier layer 120 comprises greater than or equal to 30.0 wt % hydrophilic powder, greater than or equal to 13.0 wt % of the fat source, and 45.0 wt % water. In some embodiments, the barrier layer 120 comprises from greater than or equal to 30.0 wt % to less than or equal to 40.0 wt % hydrophilic powder, from greater than or equal to 13.0 wt % to less than or equal to 20.0 wt % of the fat source, and from greater than or equal to 45.0 wt % to less than or equal to 55.0 wt % water. In some embodiments, the barrier layer 120 comprises greater than or equal to 55.0 wt % hydrophilic powder, greater than or equal to 5.0 wt % of the fat source, greater than or equal to 5.0 wt % water, and greater than or equal to 25.0 wt % of one or more additional components. In some embodiments, the barrier layer comprises from greater than or equal to 55.0 wt % to less than or equal to 70.0 wt % hydrophilic powder, from greater than or equal to 5.0 wt % to less than or equal to 15.0 wt % of the fat source, from greater than or equal to 5.0 wt % to less than or equal to 15.0 wt % water, and from greater than or equal to 25.0 wt % to less than or equal to 40.0 wt % of one or more additional components.

In some embodiments, the barrier layer 120 comprises glycerin in amounts from greater than or equal to 10.0 wt % to less than or equal to 30.0 wt %, such as from greater than or equal to 12.0 wt % to less than or equal to 30.0 wt %, from greater than or equal to 15.0 wt % to less than or equal to 30.0 wt %, from greater than or equal to 17.0 wt % to less than or equal to 30.0 wt %, from greater than or equal to 20.0 wt % to less than or equal to 30.0 wt %, from greater than or equal to 22.0 wt % to less than or equal to 30.0 wt %, from greater than or equal to 25.0 wt % to less than or equal to 30.0 wt %, or from greater than or equal to 27.0 wt % to less than or equal to 30.0 wt %. In some embodiments, the barrier layer 120 comprises glycerin in amounts from greater than or equal to 10.0 wt % to less than or equal to 27.0 wt %, such as from greater than or equal to 10.0 wt % to less than or equal to 25.0 wt %, from greater than or equal to 10.0 wt % to less than or equal to 22.0 wt %, from greater than or equal to 10.0 wt % to less than or equal to 20.0 wt %, from greater than or equal to 10.0 wt % to less than or equal to 17.0 wt %, from greater than or equal to 10.0 wt % to less than or equal to 15.0 wt %, or from greater than or equal to 10.0 wt % to less than or equal to 12.0 wt %. In embodiments, the barrier layer 120 comprises glycerin in amounts from greater than or equal to 12.0 wt % to less than or equal to 27.0 wt %, from greater than or equal to 15.0 wt % to less than or equal to 25.0 wt %, or from greater than or equal to 17.0 wt % to less than or equal to 22.0 wt %.

The hydrophilic powder, fat source, and, optionally, water and/or one or more additional components may be mixed together to form the barrier layer 120 by any suitable method. According to embodiments, the hydrophilic powder, fat source, and, optionally, water and/or one or more additional components are combined into a vessel and mixed at temperatures sufficient to allow for homogenous mixing of hydrophilic powder, fat source, and, optionally, water and/or one or more additional components. The heating and mixing may be accomplished by conventional techniques and with conventional equipment known in the art. Once hydrophilic powder, fat source, and, optionally, water and/or one or more additional components are combined into a homogenous mixture, the mixture is cooled to room temperature. Equipment that can be used for mixing, according to embodiments, includes Hobart mixers, scraped surface mixers and agitators.

Outer Layer

The composition of the outer layer 130 of the multilayer edible product 100, 200 is not particularly limited as long as it has a fat content that is either greater than or less than the fat content of the center 110 and/or a water activity that is either greater than or less than the water activity of the center 110. According to embodiments, the outer layer may comprise granola, breading, crumbs, or dough. The outer layer 130 may be produced by any conventional method or equipment.

Multilayer Edible Product

As described above, and with reference to FIG. 1, the multilayer edible product 100 comprises a center 110, a barrier layer 120 directly encompassing the center 110, and an outer layer 130 directly encompassing the barrier layer 120 and indirectly encompassing the center 110. This multilayer edible product 100 may be formed into a layer structure using the center 110, barrier layer 120, and outer layer 130 described above. The multilayer edible product 100 may be produced by any suitable method or equipment that is capable of forming the multilayer product. According to some embodiments, the multilayer edible product 100 may be formed by co-extrusion, such as, for example, triple extrusion.

Co-extrusion processes according to embodiments comprise simultaneous extruding the layers of the multilayer edible product 100. For example, and according to embodiments, the co-extrusion process, such as, for example, triple extrusion, comprises loading the center composition, the barrier layer composition, and the outer layer composition into a co-extrusion machine, such as, for example, a triple extrusion machine. The center composition, the barrier layer composition, and the outer layer composition should each have a viscosity and flow rate such that each of the center composition, the barrier layer composition, and the outer layer composition can be extruded by the co-extrusion machine. In this regard, the center composition, the barrier layer composition, and the outer layer composition may require heating to reach the desired viscosity for co-extrusion. It should be understood that the center composition, the barrier layer composition, and the outer layer composition may be heated, either simultaneously or individually to temperatures that permit the center composition, the barrier layer composition, and the outer layer composition to be co-extruded.

Once the center composition, the barrier layer composition, and the outer layer composition are at the appropriate viscosity and flow rate so that they may be co-extruded, the center composition, the barrier layer composition, and the outer layer composition are expelled from the co-extrusion machine via a co-extrusion nozzle or similar device. The co-extrusion nozzle has three separate outlets; one each for the center composition, the barrier layer composition, and the outer layer composition. The first and center-most outlet of the co-extrusion nozzle expels the center composition. The second outlet of the co-extrusion nozzle is annular and positioned outside of the first outlet of the co-extrusion nozzle. The second outlet of the co-extrusion nozzle expels the barrier layer. The third outlet is of the co-extrusion nozzle is annular and position outside of the second outlet of the co-extrusion nozzle—and, therefore also outside of the first outlet of the co-extrusion nozzle. The third outlet of the co-extrusion nozzle expels the outer layer composition. Using such a co-extrusion nozzle provides a multilayer edible product 100 as shown in FIG. 1.

It should be understood that the physical dimensions of the first outlet, the second outlet, and the third outlet of the co-extrusion nozzle will roughly correlate to the dimensions of the center 110, the barrier layer 120, and the outer layer 130, respectively, of the multilayer edible product 100. The dimensions of the center 110 and the outer layer 130 are not particularly limited; the thickness t of the barrier layer 120 may affect the ability of the barrier layer to prevent migration of fat and/or moisture from the center 110 to the outer layer 130. Accordingly, in embodiments, the thickness of the barrier layer may be selected to achieve the desired prevention of fat and/or moisture from the center 110 to the outer layer 130.

In embodiments, the thickness of the barrier layer 120 is less than or equal to 1.00 mm, such as less than or equal to 0.90 mm, less than or equal to 0.80 mm, less than or equal to 0.70 mm, less than or equal to 0.60 mm, less than or equal to 0.50 mm, less than or equal to 0.40 mm, less than or equal to 0.30 mm, less than or equal to 0.20 mm, or less than or equal to 0.10 mm. In embodiments, the minimum thickness of the barrier layer 120 is 0.02 mm. Accordingly, in some embodiments, the thickness of the barrier layer 120 is from greater than or equal to 0.02 mm to less than or equal to 1.00 mm, such as from greater than or equal to 0.02 mm to less than or equal to 0.90 mm, from greater than or equal to 0.02 mm to less than or equal to 0.80 mm, from greater than or equal to 0.02 mm to less than or equal to 0.70 mm, from greater than or equal to 0.02 mm to less than or equal to 0.60 mm, from greater than or equal to 0.02 mm to less than or equal to 0.50 mm, from greater than or equal to 0.02 mm to less than or equal to 0.40 mm, from greater than or equal to 0.02 mm to less than or equal to 0.30 mm, from greater than or equal to 0.02 mm to less than or equal to 0.20 mm, from greater than or equal to 0.02 mm to less than or equal to 0.10 mm, or from greater than or equal to 0.02 mm to less than or equal to 0.05 mm. In embodiments, the thickness of the barrier layer 120 is from greater than or equal to 0.05 mm to less than or equal to 1.00 mm, such as from greater than or equal to 0.10 mm to less than or equal to 1.00 mm, from greater than or equal to 0.20 mm to less than or equal to 1.00 mm, from greater than or equal to 0.30 mm to less than or equal to 1.00 mm, from greater than or equal to 0.40 mm to less than or equal to 1.00 mm, from greater than or equal to 0.50 mm to less than or equal to 1.00 mm, from greater than or equal to 0.60 mm to less than or equal to 1.00 mm, from greater than or equal to 0.70 mm to less than or equal to 1.00 mm, from greater than or equal to 0.80 mm to less than or equal to 1.00 mm, or from greater than or equal to 0.90 mm to less than or equal to 1.00 mm. In embodiments, the thickness of the barrier layer 120 is from greater than or equal to 0.05 mm to less than or equal to 0.90 mm, such as from greater than or equal to 0.10 mm to less than or equal to 0.80 mm, from greater than or equal to 0.20 mm to less than or equal to 0.70 mm, from greater than or equal to 0.30 mm to less than or equal to 0.60 mm, or from greater than or equal to 0.40 mm to less than or equal to 0.50 mm.

In embodiments, the thickness of the barrier layer is greater than or equal to 1.00 mm, such as greater than or equal to 1.25 mm, greater than or equal to 1.50 mm, greater than or equal to 1.75 mm, greater than or equal to 2.00 mm, greater than or equal to 2.25 mm, greater than or equal to 2.50 mm, greater than or equal to 2.75 mm, greater than or equal to 3.00 mm, greater than or equal to 3.25 mm, greater than or equal to 3.50 mm, greater than or equal to 3.75 mm, greater than or equal to 4.00 mm, greater than or equal to 4.25 mm, greater than or equal to 4.50 mm, or greater than or equal to 4.75 mm. In embodiments, the maximum thickness of the barrier layer 120 is 5.00 mm. Accordingly, in some embodiments, the thickness of the barrier layer is from greater than or equal to 1.00 mm to less than or equal to 5.00 mm, such as from greater than or equal to 1.25 mm to less than or equal to 5.00 mm, from greater than or equal to 1.50 mm to less than or equal to 5.00 mm, from greater than or equal to 1.75 mm to less than or equal to 5.00 mm, from greater than or equal to 2.00 mm to less than or equal to 5.00 mm, from greater than or equal to 2.25 mm to less than or equal to 5.00 mm, from greater than or equal to 2.50 mm to less than or equal to 5.00 mm, from greater than or equal to 2.75 mm to less than or equal to 5.00 mm, from greater than or equal to 3.00 mm to less than or equal to 5.00 mm, from greater than or equal to 3.25 mm to less than or equal to 5.00 mm, from greater than or equal to 3.50 mm to less than or equal to 5.00 mm, from greater than or equal to 3.75 mm to less than or equal to 5.00 mm, from greater than or equal to 4.00 mm to less than or equal to 5.00 mm, from greater than or equal to 4.25 mm to less than or equal to 5.00 mm, from greater than or equal to 4.50 mm to less than or equal to 5.00 mm, or from greater than or equal to 4.75 mm to less than or equal to 5.00 mm. In embodiments, the thickness of the barrier layer is from greater than or equal to 1.00 mm to less than or equal to 4.75 mm, such as from greater than or equal to 1.00 mm to less than or equal to 4.50 mm, from greater than or equal to 1.00 mm to less than or equal to 4.25 mm, from greater than or equal to 1.00 mm to less than or equal to 4.00 mm, from greater than or equal to 1.00 mm to less than or equal to 3.75 mm, from greater than or equal to 1.00 mm to less than or equal to 3.50 mm, from greater than or equal to 1.00 mm to less than or equal to 3.25 mm, from greater than or equal to 1.00 mm to less than or equal to 3.00 mm, from greater than or equal to 1.00 mm to less than or equal to 2.75 mm, from greater than or equal to 1.00 mm to less than or equal to 2.50 mm, from greater than or equal to 1.00 mm to less than or equal to 2.25 mm, from greater than or equal to 1.00 mm to less than or equal to 2.00 mm, from greater than or equal to 1.00 mm to less than or equal to 1.75 mm, from greater than or equal to 1.00 mm to less than or equal to 1.50 mm, or from greater than or equal to 1.00 mm to less than or equal to 1.25 mm. In some embodiments, the thickness of the barrier layer 120 is from greater than or equal to 1.25 mm to less than or equal to 4.75 mm, such as from greater than or equal to 1.50 mm to less than or equal to 4.50 mm, from greater than or equal to 1.75 mm to less than or equal to 4.25 mm, from greater than or equal to 2.00 mm to less than or equal to 4.00 mm, from greater than or equal to 2.25 mm to less than or equal to 3.75 mm, from greater than or equal to 2.50 mm to less than or equal to 3.50 mm, or from greater than or equal to 2.75 mm to less than or equal to 3.25 mm.

The embodiments described herein will be further clarified by the following examples.

EXAMPLES

Multilayer edible products according to embodiments disclosed and described herein were produced using the following ingredients for the center, the barrier layer, and the outer layer.

A nut-based center was formed by mixing the ingredients shown in Table 1 below until well mixed. Initially, the palm oil was melted down together with the peanut oil (and other fat sources present) in a heated jacket with agitation to provide a consistent mixture. When the combined oil was completely fluid, the peanut butter was added to the oils. After the peanut butter was completely melted into the oils, the powdered ingredients (such as salt and sugar) and lecithin were added to the mixture.

TABLE 1

| Ingredient | Weight Percent |
|---|---|
| Peanut Butter | 68.39 |
| Powdered Sugar | 17.2 |
| Peanut Oil | 5.37 |
| Sunflower Lecithin | 0.54 |
| Palm Oil | 7.53 |
| Salt | 0.97 |
| Total | 100 |

The nut-based center formed as described above had the emulsion properties as shown in Table 2.

TABLE 2

| Sample Temp (° C.) | Start (sec) | End (sec) | Duration (sec) | Mean RCF (g) | Velocity (%/h) | Velocity at 1 × g (mm/day) | Corr. coeff. |
|---|---|---|---|---|---|---|---|
| 25 | 29.4 | 1,199 | 1,170 | 1,981 | 35.8 | $4.00 \times 10^{-4}$ | 0.9778 |
| 40 | 29.4 | 1,199 | 1,170 | 1,997 | 193 | $2.00 \times 10^{-3}$ | 0.9240 | mm to less than or equal to 3.50 mm, from greater than or equal to 1.00 mm to less than or equal to 3.25 mm, from greater than or equal to 1.00 mm to less than or equal to 3.00

In addition, the nut-based center formed as described above had the following fat composition as measured by AOAC 996.06, as shown in Table 3.

TABLE 3

| Fat Profile | Result |
|---|---|
| Monounsaturated Fat | 25.04 wt % |
| Omega-3 Fatty Acids | 0.04 g/100 g |
| Omega-6 Fatty Acids | 10.35 g/100 g |
| Polyunsaturated Fat | 10.39 wt % |
| Saturated Fat | 13.52 wt % |
| Total Fat | 51.21 wt % |
| Trans Fat | 0.04 wt % |

The nut-based center had a mean particle size distribution of 24.0 μm; a $D_{10}$ particle size distribution of 3.46 μm; a $D_{50}$ (median) particle size distribution of 21.0 μm; and a $D_{90}$ particle size distribution of 50.6 μm, all measured by laser diffraction.

A barrier layer was formed by mixing the ingredients shown in Table 4 below until well mixed. All the dry ingredients (such as cake flour and molasses powder) were mixed together in a Hobart mixer with a paddle attachment. Separately, the palm oil and other liquid oils (such as vegetable oil) were melted down into a liquid with agitation as needed. When the oil was completely liquid, water was added and the mixture was re-melted if the oil solidified upon addition of the water. The water and oil mixture was slowly drizzled into the dry ingredients while the dry ingredients were in the mixer while mixing. The glycerin was then slowly drizzled into the mixture of dry ingredients/water/oil in the mixer while mixing until it is completely combined and doughy. The dough was inspected to ensure there were no pellets of oil in the mixture. The barrier layer had a total water activity of about 0.288.

TABLE 4

| Ingredient | Weight Percent |
|---|---|
| Cake Flour | 57.3 |
| Molasses | 5.0 |
| Vegetable Oil | 5.2 |
| Palm Oil | 5.2 |
| Water | 5.1 |
| Glycerin | 22.2 |
| Total | 100.0 |

An outer layer was formed by mixing the ingredients shown in Table 5 below until well mixed. All dry ingredients (such as oats, sugar, molasses powder, salt, baking soda, soy rice crisps, protein puffs, soy protein, presca crisp starch, honey flavor) were mixed in a paddle mixer. Separately, the wet ingredients (vegetable oil, water, brown rice syrup, fibersol) were combined and mixed. The wet ingredients were slowly poured into the dry ingredients while mixing. The combined wet and dry ingredients were mixed until they came together in a dough. The water activity of the outer layer was 0.481.

TABLE 5

| Ingredients | Weight Percent |
|---|---|
| Rolled Oats | 31.95 |
| Sugar | 10.53 |
| Qwik-Flow Dark Molasses Powder | 2.32 |
| Salt | 0.21 |
| Baking Soda | 0.42 |

TABLE 5-continued

| Ingredients | Weight Percent |
|---|---|
| Vegetable Oil | 10.53 |
| Water | 9.32 |
| Brown Rice Syrup 60DE | 9.53 |
| Honey | 1 |
| Fibersol 2L | 3.16 |
| SWP soy rice crisp 650# | 10.11 |
| Protein puffs tiny tote | 2.53 |
| Soy Protein | 4.21 |
| Presca Crisp 330 | 3.16 |
| Honey Flavor | 1.05 |
| Total | 100.0 |

The mixed center, barrier layer, and outer layer made as disclosed above were individually loaded into a triple extruder such as extruders from Aasted and Rheon, where the center composition (as shown in Table 1) is inserted into to the triple extruder so that it is extruded as a center portion of the extruded product, the barrier layer composition (as shown in Table 4) is inserted into the triple extruder so that it is extruded as an intermediate portion of the extruded product, and the outer layer composition (as shown in Table 5) is inserted into the triple extruder so that it is extruded as an outer portion of the extruded product. Three batches of extruded products were made according to the parameters shown in Table 6 below.

TABLE 6

| | Outer Layer | | Barrier Layer | | Center | |
|---|---|---|---|---|---|---|
| Batch | Speed | Target Mass | Speed | Target Mass | Speed | Average Est Mass (g) |
| 1 | 18 | 20 | 7 | 4 | 120 | 3.81 |
| 2 | 16 | 18 | 7 | 4 | 120 | 5.17 |
| 3 | 16 | 18 | 7 | 4 | 248 | 9.54 |

Extruded products from each of the batches were placed on trays and baked in an oven for the time and at the temperature provided in Tables 7-9 below.

TABLE 7

| Batch 1 | | |
|---|---|---|
| Tray | Time (min) | Temp (° F.) |
| 1 | 10 | 350 |
| 2 | 11 | 350 |
| 3 | 11 | 350 |

TABLE 8

| Batch 2 | | |
|---|---|---|
| Tray | Time (min) | Temp (° F.) |
| 4 | 11 | 350 |
| 5 | 11 | 350 |

TABLE 9

| | Batch 3 | |
| --- | --- | --- |
| Tray | Time (min) | Temp (° F.) |
| 6 | 11 | 350 |
| 7 | 11 | 350 |

To measure the moisture lost during backing, the pre-bake weights and the post bake weights were measured for the multilayer edible product in each tray. The results of these measurements are provided in Tables 10-16 below.

TABLE 10

| | Tray 1 | |
| --- | --- | --- |
| Pre-bake (g) | Post-bake (g) | % Loss |
| 27.91 | 26.47 | 5.16 |
| 28.67 | 27.31 | 4.74 |
| 27.62 | 26.31 | 4.74 |
| 28.06 | 26.76 | 4.63 |
| 26.21 | 24.89 | 5.04 |
| 28.19 | 26.83 | 4.82 |
| 28.39 | 27.08 | 4.61 |
| 27.54 | 26.26 | 4.65 |
| 27.89 | 26.62 | 4.55 |
| 26.32 | 25.01 | 4.98 |
| 28.62 | 27.22 | 4.89 |
| 29.23 | 27.92 | 4.48 |

TABLE 11

| | Tray 2 | |
| --- | --- | --- |
| Pre-bake (g) | Post-bake (g) | % Loss |
| 28.51 | 24.84 | 12.87 |
| 27.35 | 25.88 | 5.37 |
| 26.63 | 25.16 | 5.52 |
| 27.33 | 25.89 | 5.27 |
| 26.37 | 24.84 | 5.80 |
| 27.73 | 26.27 | 5.27 |
| 27.87 | 26.57 | 4.66 |
| 27.15 | 25.7 | 5.34 |
| 27.17 | 25.67 | 5.52 |
| 27.38 | 25.88 | 5.48 |
| 28.91 | 27.47 | 4.98 |
| 29.38 | 27.97 | 4.80 |

TABLE 12

| | Tray 3 | |
| --- | --- | --- |
| Pre-bake (g) | Post-bake (g) | % Loss |
| 27.39 | 26.07 | 4.82 |
| 28.67 | 27.59 | 3.77 |
| 28.08 | 26.96 | 3.99 |
| 28.37 | 26.78 | 5.60 |
| 28.04 | 26.99 | 3.74 |
| 25.89 | 24.84 | 4.06 |
| 27.83 | 26.93 | 3.23 |
| 27.95 | 26.95 | 3.58 |
| 28.1 | 26.95 | 4.09 |
| 28.81 | 27.67 | 3.96 |
| 27.14 | 26.09 | 3.87 |
| 28.43 | 27.48 | 3.34 |

TABLE 13

| | Tray 4 | |
| --- | --- | --- |
| Pre-bake (g) | Post-bake (g) | % Loss |
| 24.88 | 24.09 | 3.18 |
| 24.44 | 23.68 | 3.11 |
| 24.48 | 22.18 | 9.40 |
| 25.51 | 24.83 | 2.67 |
| 26.19 | 25.33 | 3.28 |
| 24.83 | 23 | 7.37 |
| 24.48 | 22.46 | 8.25 |
| 26.61 | 25.36 | 4.70 |
| 26.19 | 25.18 | 3.86 |
| 24.06 | 23.17 | 3.70 |
| 25.65 | 24.92 | 2.85 |
| 25.24 | 24.5 | 2.93 |

TABLE 14

| | Tray 5 | |
| --- | --- | --- |
| Pre-bake (g) | Post-bake (g) | % Loss |
| 24.41 | 23.59 | 3.36 |
| 25.98 | 25.1 | 3.39 |
| 26.08 | 25.17 | 3.49 |
| 24.11 | 23.24 | 3.61 |
| 26.03 | 25.12 | 3.50 |
| 24.91 | 24.05 | 3.45 |
| 24.83 | 23.92 | 3.66 |
| 26.11 | 25.18 | 3.56 |
| 25.84 | 24.87 | 3.75 |
| 24.51 | 23.52 | 4.04 |
| 24.34 | 23.5 | 3.45 |
| 24.29 | 23.45 | 3.46 |

TABLE 15

| | Tray 6 | |
| --- | --- | --- |
| Pre-bake (g) | Post-bake (g) | % Loss |
| 29.68 | All Leaked | |
| 28.31 | | |
| 30.49 | | |
| 27.95 | | |
| 29.31 | | |
| 30.1 | | |
| 29.5 | | |
| 27.9 | | |
| 31.16 | | |
| 29.84 | | |
| 30.66 | | |
| 30.07 | | |

TABLE 16

| | Tray 7 | |
| --- | --- | --- |
| Pre-bake (g) | Post-bake (g) | % Loss |
| 29.97 | All Leaked | |
| 27.67 | | |
| 31.36 | | |
| 31.18 | | |
| 28.51 | | |
| 30.67 | | |
| 30.53 | | |
| 28.2 | | |

TABLE 16-continued

| | | |
|---|---|---|
| | Tray 7 | |
| Pre-bake (g) | Post-bake (g) | % Loss |
| 28.75 | | |
| 30.44 | | |
| 28.36 | | |
| 28.4 | | |

The average moisture lost during baking (Bake Loss) for each tray of multilayer edible products was measured and the results are shown in Table 17 below.

TABLE 17

| Tray | Initial Moisture (Ave Mass) | Bake Loss (Ave Mass) | Final Moisture (Ave Mass) |
|---|---|---|---|
| 1 | 2.404 | 1.36 | 1.044 |
| 2 | 2.184 | 1.45 | 0.734 |
| 3 | 2.184 | 1.049 | 1.135 |
| 4 | 2.184 | 1.155 | 1.029 |
| 5 | 2.184 | 0.894 | 1.29 |

In the above example, it is important to work with the outer layer and the middle layer quickly to ensure that they do not dry out, thus remaining extrudable without overworking the extruder. This also allows for more control over the amount of water added to each layer. The baking temperatures and durations are important to allow the food product to behave as desired. For instance, if the food product is baked at an incorrect temperature and time, the nut-based center may not melt, the outer layer may not be crispy (which is desired), and the desired shelf-life may not be achieved.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A multilayer edible product comprising:
a center;
a barrier layer directly encompassing at least a portion of the center, the barrier layer formed from a homogenous, doughy, extruded mixture, the barrier layer comprising:
sugar;
greater than or equal to 30.0 wt % of a hydrophilic powder;
greater than or equal to 13.0 wt % of a source of fat; and
greater than or equal to 45.0 wt % water,
wherein the hydrophilic powder and the source of fat are distinct components; and
an outer layer directly encompassing the barrier layer and indirectly encompassing the center,
wherein the center has at least one of:
a fat content that is either greater than or less than a fat content of the outer layer, or
a water activity that is either greater than or less than a water activity of the outer layer, and
wherein a composition of the barrier layer is different than a composition of the center and a composition of the outer layer.

2. The multilayer edible product of claim 1, wherein the center has at least one of:
a fat content that is greater than the fat content of the outer layer, or
a water activity that is less than a water activity of the outer layer.

3. The multilayer edible product of claim 1, wherein the barrier layer has a thickness of less than or equal to 1.00 mm.

4. The multilayer edible product of claim 1, wherein the barrier layer has a thickness of less than or equal to 0.50 mm.

5. The multilayer edible product of claim 1, wherein the barrier layer has a thickness of greater than or equal to 1.00 mm.

6. The multilayer edible product of claim 1, wherein the barrier layer further comprises water.

7. The multilayer edible product of claim 1, wherein the hydrophilic powder is selected from the group consisting of flour, powdered sugar, and mixtures thereof.

8. The multilayer edible product of claim 1, wherein the source of fat is a solid source of fat.

9. The multilayer edible product of claim 8, wherein the solid fat source is selected from the group consisting of palm oil, coconut oil, and mixtures thereof.

10. The multilayer edible product of claim 1, wherein the barrier layer further comprises one or more of a sweetener, natural or artificial flavor, colorant, and mixtures thereof.

11. The multilayer edible product of claim 1, wherein the barrier layer comprises:
from greater than or equal to 30.0 wt % to less than or equal to 40.0 wt % hydrophilic powder;
from greater than or equal to 13.0 wt % to less than or equal to 20.0 wt % of the fat source; and
from greater than or equal to 45.0 wt % to less than or equal to 55.0 wt % water.

12. The multilayer edible product of claim 1, wherein the hydrophilic powder is selected from the group consisting of flour, powdered sugar, and mixtures thereof, and
the fat source is a solid fat source selected from the group consisting of palm oil, coconut oil, and mixtures thereof.

13. A multilayer edible product comprising:
a center;
a barrier layer directly encompassing at least a portion of the center, the barrier layer formed from a homogenous, doughy, extruded mixture, the barrier layer comprising:
sugar;
a hydrophilic powder; and
a source of fat,
wherein the hydrophilic powder and the source of fat are distinct components; and
an outer layer directly encompassing the barrier layer and indirectly encompassing the center,
wherein:
the center has at least one of:
a fat content that is either greater than or less than a fat content of the outer layer, or
a water activity that is either greater than or less than a water activity of the outer layer, and
wherein a composition of the barrier layer is different than a composition of the center and a composition of the outer layer;
the center comprises:
greater than or equal to 53.0 wt % pulverized nuts;
greater than or equal to 10.0 wt % hydrophilic powder;
greater than or equal to 0.0 wt % low-melting temperature fat; and greater than or equal to 5.0 wt % high-melting tem-
perature fat, wherein the center has a viscosity less
than or equal to 1000 Pa·s at temperatures less than
or equal to 50° C.; and the barrier layer comprises:

from greater than or equal to 55.0 wt % to less than or
equal to 70.0 wt % hydrophilic powder;

from greater than or equal to 5.0 wt % to less than or
equal to 15.0 wt % of the fat source;

from greater than or equal to 5.0 wt % to less than or
equal to 15.0 wt % water; and from greater than or equal to 25.0 wt % to less than or
equal to 40.0 wt % of one or more additional
components selected from the group consisting of a
sweetener, natural or artificial flavor, colorant, and
mixtures thereof.

14. The multilayer edible product of claim 13, wherein the
pulverized nuts are selected from the group consisting of
almonds, peanuts, cashews, chestnuts, hazelnuts, and mix-
tures thereof.

15. The multilayer edible product of claim 13, wherein the
pulverized nuts are selected from almonds or peanuts.

16. The multilayer edible product of claim 1, wherein the
outer layer comprises a dough.

\* \* \* \* \*